US008369522B2

(12) United States Patent
Shirai et al.

(10) Patent No.: US 8,369,522 B2
(45) Date of Patent: Feb. 5, 2013

(54) ENCRYPTION PROCESSING APPARATUS, ENCRYPTION METHOD, AND COMPUTER PROGRAM

(75) Inventors: Taizo Shirai, Kanagawa (JP); Kyoji Shibutani, Kanagawa (JP); Toru Akishita, Tokyo (JP); Shiho Moriai, Kanagawa (JP)

(73) Assignee: Sony Corpoation, Tokyo (JP)

( * ) Notice: Subject to any disclaimer, the term of this patent is extended or adjusted under 35 U.S.C. 154(b) by 1011 days.

(21) Appl. No.: 12/439,544

(22) PCT Filed: Aug. 29, 2007

(86) PCT No.: PCT/JP2007/066733
§ 371 (c)(1),
(2), (4) Date: Mar. 1, 2009

(87) PCT Pub. No.: WO2008/026625

PCT Pub. Date: Mar. 6, 2008

(65) Prior Publication Data
US 2010/0008498 A1    Jan. 14, 2010

(30) Foreign Application Priority Data

Sep. 1, 2006  (JP) .................................. 2006-238228

(51) Int. Cl.
*H04L 29/06*   (2006.01)
(52) U.S. Cl. .............................. 380/44; 713/194; 360/28
(58) Field of Classification Search ............ 380/37, 380/44, 28
See application file for complete search history.

(56) References Cited

U.S. PATENT DOCUMENTS 5,317,638 A  * 5/1994  Kao et al. ......................... 380/29
7,639,800 B2 * 12/2009  Kasuya et al. .................. 380/37

FOREIGN PATENT DOCUMENTS

JP   2003-345244     12/2003
WO   WO 02/058037 A1  7/2002

OTHER PUBLICATIONS

Notice of Reasons for Rejection issued by Japanese Patent Office on Dec. 13, 2011 in corresponding Japanese application No. 2006-238228.
Written Opinion of the International Searching Authority from the International Bureau of WIPO, undated.
Kaisa Nyberg, "Generalized Feistel Networks", pp. 91-104, Finnish Defence Forces, CIS Division, Helsinki, Finland. Yuliang Zheng et al., "On the Construction of Block Ciphers Provably Secure and Not Relynig on Any Unproved Hypotheses", pp. 461-480, Division of Electrical and Computer Engineering, Yokohama National University, Yokohama. Japan.

* cited by examiner

*Primary Examiner* — Jung Kim
*Assistant Examiner* — Ghodrat Jamshidi
(74) *Attorney, Agent, or Firm* — Finnegan, Henderson, Farabow, Garrett & Dunner, L.L.P.

(57) ABSTRACT

A common-key blockcipher processing structure that makes analysis of key more difficult and enhances security and implementation efficiency is realized. In a key scheduling part in an encryption processing apparatus that performs common-key blockcipher processing, a secret key is input to an encryption function including a round function employed in an encryption processing part to generate an intermediate key, and the result of performing bijective transformation based on the intermediate key, the secret key, and the like and the result of performing an exclusive-OR operation on the bijective-transformed data are applied to round keys. With this structure, generation of round keys based on the intermediate key generated using the encryption function whose security has been ensured is performed, thereby making it possible to make analysis of the keys more difficult. The structure of the key scheduling part can be simplified, thereby making it possible to improve the implementation efficiency.

26 Claims, 28 Drawing Sheets

FIG. 17

| | |
|---|---|
| $RK_1$ | $p_1(MK)$ |
| $RK_2$ | $p_{2,1}(MK) \oplus p_{2,2}(K)$ |
| $RK_3$ | $p_3(MK)$ |
| $RK_4$ | $p_{4,1}(MK) \oplus p_{4,2}(K)$ |
| $RK_5$ | $p_5(MK)$ |
| $RK_6$ | $p_{6,1}(MK) \oplus p_{6,2}(K)$ |
| $RK_7$ | $p_7(MK)$ |
| $RK_8$ | $p_{8,1}(MK) \oplus p_{8,2}(K)$ |
| $RK_9$ | $p_9(MK)$ |
| $RK_{10}$ | $p_{10,1}(MK) \oplus p_{10,2}(K)$ |
| $RK_{11}$ | $p_{11}(MK)$ |
| $RK_{12}$ | $p_{12,1}(MK) \oplus p_{12,2}(K)$ |
| $RK_{13}$ | $p_{13}(MK)$ |

| | |
|---|---|
| $RK_1$ | $p_1(MK1)$ |
| $RK_2$ | $p_{2,1}(MK1) \oplus p_{2,2}(K2)$ |
| $RK_3$ | $p_3(MK2)$ |
| $RK_4$ | $p_{4,1}(MK2) \oplus p_{4,2}(K1)$ |
| $RK_5$ | $p_5(MK1)$ |
| $RK_6$ | $p_{6,1}(MK1) \oplus p_{6,2}(K2)$ |
| $RK_7$ | $p_7(MK2)$ |
| $RK_8$ | $p_{8,1}(MK2) \oplus p_{8,2}(K1)$ |
| $RK_9$ | $p_9(MK1)$ |
| $RK_{10}$ | $p_{10,1}(MK1) \oplus p_{10,2}(K2)$ |
| $RK_{11}$ | $p_{11}(MK2)$ |
| $RK_{12}$ | $p_{12,1}(MK2) \oplus p_{12,2}(K1)$ |
| $RK_{13}$ | $p_{13}(MK1)$ |

$\vdots$

FIG. 26

| | |
|---|---|
| $RK_1$ | $p_1(MK1)$ |
| $RK_2$ | $p_{2,1}(MK1) \oplus p_{2,2}(K2)$ |
| $RK_3$ | $p_3(MK2)$ |
| $RK_4$ | $p_{4,1}(MK2) \oplus p_{4,2}(K1)$ |
| $RK_5$ | $p_5(MK1)$ |
| $RK_6$ | $p_{6,1}(MK1) \oplus p_{6,2}(K2)$ |
| $RK_7$ | $p_7(MK2)$ |
| $RK_8$ | $p_{8,1}(MK2) \oplus p_{8,2}(K1)$ |
| $RK_9$ | $p_9(MK1)$ |
| $RK_{10}$ | $p_{10,1}(MK1) \oplus p_{10,2}(K2)$ |
| $RK_{11}$ | $p_{11}(MK2)$ |
| $RK_{12}$ | $p_{12,1}(MK2) \oplus p_{12,2}(K1)$ |
| $RK_{13}$ | $p_{13}(MK1)$ |

⋮

ENCRYPTION PROCESSING APPARATUS, ENCRYPTION METHOD, AND COMPUTER PROGRAM

TECHNICAL FIELD

The present invention relates to encryption processing apparatuses, encryption processing methods, and computer programs. More particularly, the present invention relates to an encryption processing apparatus, an encryption processing method, and a computer program for performing common-key blockcipher processing.

BACKGROUND ART

As network communication and electronic commerce have been developed in the recent years, the ensuring of security in communication has been an important issue. One method of ensuring security is cryptography. Currently, communication has been actually done using various ciphers.

For example, a system has been put to practical use in which an encryption processing module is embedded in a small device, such as an IC card, and data transmission/reception is performed between the IC card and a reader/writer serving as a data-reading/writing device, thereby implementing authentication processing or encryption/decryption of transmission/reception data.

Various encryption processing algorithms are available. These encryption algorithms can be largely classified into public-key cryptography in which an encryption key and a decryption key are set as different keys, such as a public key and a secret key, and common-key cryptography in which an encryption key and a decryption key are set as a common key.

There are various algorithms for common-key cryptography. One algorithm involves generating a plurality of keys on the basis of a common key and repeatedly performing data transformation processing in units of blocks (e.g., 64 bits or 128 bits) using the generated keys. A typical algorithm employing such a key generation scheme and data transformation processing is a common-key blockcipher.

As typical common-key blockcipher algorithms, for example, a DES (Data Encryption Standard) algorithm, which was a standard cipher for the United States in the past, and an AES (Advanced Encryption Standard) algorithm, which is a standard cipher for the United States at present, are known.

These common-key blockcipher algorithms are mainly constituted of an encryption processing part including round-function executing parts that repeatedly perform transformation of input data, and a key scheduling part that generates round keys applied to respective rounds of the round-function parts. The key scheduling part generates an expanded key on the basis of a master key (main key) which is a secret key by increasing the number of bits, and, on the basis of the generated expanded key, generates round keys (sub-keys) to be applied to the respective round-function parts of the encryption processing part.

As a specific structure for executing such an algorithm, a structure that repeatedly executes a round function including a linear transformation part and a non-linear transformation part is known. For example, a Feistel structure is one typical structure. A Feistel structure has a structure that transforms plaintext into ciphertext by simply repeating a round function (F-function) serving as a data transformation function. In a round function (F-function), linear transformation processing and non-linear transformation processing are executed. Note that, as documents describing encryption processing using a Feistel structure, there are, for example, Non-Patent Document 1 and Non-Patent Document 2.

However, the common-key blockcipher has a problem of the leakage of keys due to cryptanalysis. The fact that the keys can be analyzed easily by cryptanalysis means that the cipher has low security, leading to a serious problem in applications.

Non-Patent Document 1: K. Nyberg, "Generalized Feistel networks", ASIACRYPT '96, Springer Verlag, 1996, pp. 91-104.

Non-Patent Document 2: Yuliang Zheng, Tsutomu Matsumoto, Hideki Imai: On the Construction of Block Ciphers Provably Secure and Not Relying on Any Unproved Hypotheses. CRYPTO 1989: 461-480

DISCLOSURE OF INVENTION

Technical Problem

The present invention has been made in view of the foregoing problems, and it is an object of the present invention to provide an encryption processing apparatus, an encryption processing method, and a computer program for increasing the difficulty of cryptanalysis and implementing a highly secure common-key blockcipher algorithm.

Technical Solution

A first aspect of the present invention resides in:

an encryption processing apparatus that performs common-key blockcipher processing, characterized by including:

an encryption processing part that performs data transformation processing in which a round function is repeated for a plurality of rounds; and a key scheduling part that generates round keys to be applied to executing the round function, wherein the key scheduling part includes an intermediate-key generating part that inputs a secret key to an encryption function including the round function employed by the encryption processing part and generates an intermediate key, and an intermediate-key expanding part that takes the intermediate key generated by the intermediate-key generating part as an input and generates round keys.

Further, in an embodiment of the encryption processing apparatus of the present invention, it is characterized in that the intermediate-key generating part is configured to input the secret key and a preset constant to the encryption function, perform encryption processing, and generate an intermediate key.

Further, in an embodiment of the encryption processing apparatus of the present invention, it is characterized in that the encryption function applied in the intermediate-key generating part is configured to include at least one stage of the round function.

Further, in an embodiment of the encryption processing apparatus of the present invention, it is characterized in that the encryption function applied in the intermediate-key generating part is configured to include a plurality of stages of the round function with a Feistel structure employed in the encryption processing part.

Further, in an embodiment of the encryption processing apparatus of the present invention, it is characterized in that the intermediate-key generating part is configured to use encryption functions employed in the encryption processing part in parallel to one another to generate a plurality of intermediate keys.

Further, in an embodiment of the encryption processing apparatus of the present invention, it is characterized in that the intermediate-key generating part is configured to take as an input a secret key having the same number of bits as a block length which is a unit for processing in the encryption function employed in the encryption processing part and generate an intermediate key having the same number of bits.

Further, in an embodiment of the encryption processing apparatus of the present invention, it is characterized in that the intermediate-key generating part is configured to take as an input a secret key having a number of bits greater than or equal to a block length which is a unit for processing in the encryption function employed in the encryption processing part, perform data transformation of the input secret key, generate a plurality of pieces of secret-key-transformed data having the same number of bits as the block length, input the secret-key-transformed data to the encryption function, and generate intermediate keys.

Further, in an embodiment of the encryption processing apparatus of the present invention, it is characterized in that the intermediate-key expanding part is configured to include a first data transformation processing part that takes as an input at least one of the secret key and secret-key-transformed data generated on the basis of the secret key and generates secret-key bijective-transformed data by performing bijective transformation, and a second data transformation processing part that takes the intermediate key generated by the intermediate-key generating part as an input and generates intermediate-key bijective-transformed data by performing bijective transformation, and an exclusive-OR calculating part that performs an exclusive-OR operation on the secret-key bijective-transformed data generated by the first data transformation processing part and the intermediate-key bijective-transformed data generated by the second data transformation processing part; and the intermediate-key expanding part is configured to output, as round keys, the intermediate-key bijective-transformed data, which is a result of processing performed by the second data transformation processing part, and processing result data obtained by the exclusive-OR calculating part.

Further, in an embodiment of the encryption processing apparatus of the present invention, it is characterized in that at least some of bijective functions applied to bijective transformation performed by the first data transformation processing part to generate respective round keys are common bijective functions.

Further, in an embodiment of the encryption processing apparatus of the present invention, it is characterized in that at least some of bijective functions applied to bijective transformation performed by the second data transformation processing part to generate respective round keys are common bijective functions.

Further, in an embodiment of the encryption processing apparatus of the present invention, it is characterized in that the intermediate-key expanding part is configured to include a data transformation processing part that takes the intermediate key generated by the intermediate-key generating part as an input and generates intermediate-key bijective-transformed data by performing bijective transformation, and an exclusive-OR calculating part that performs an exclusive-OR operation on one of the secret key and secret-key-transformed data generated on the basis of the secret key and on the intermediate-key bijective-transformed data generated by the data transformation processing part; and the intermediate-key expanding part is configured to output, as round keys, the intermediate-key bijective-transformed data, which is a result of processing performed by the data transformation processing part, and processing result data obtained by the exclusive-OR calculating part.

Further, a second aspect of the present invention resides in:
an encryption processing method for an encryption processing apparatus that performs common-key blockcipher processing, characterized by including:
a key generating step of generating, with a key scheduling part, round keys applied to executing a round function executed by an encryption processing part; and
an encryption processing step of taking, with the encryption processing part, the round keys as inputs and performing data transformation processing in which the round function is repeated for a plurality of rounds,
wherein the key generating step includes
an intermediate-key generating step of inputting, with an intermediate-key generating part, a secret key to an encryption function including the round function employed by the encryption processing part and generating an intermediate key, and
an intermediate-key expanding step of taking, with an intermediate-key expanding part, the intermediate key generated by the intermediate-key generating part as an input and generating round keys.

Further, a third aspect of the present invention resides in:
a computer program for allowing an encryption processing apparatus that performs common-key blockcipher processing to perform encryption processing, the encryption processing characterized by including:
a key scheduling step of generating, with a key scheduling part, round keys applied to executing a round function executed by an encryption processing part; and
an encryption processing step of taking, with the encryption processing part, the round keys as inputs and performing data transformation processing in which the round function is repeated for a plurality of rounds.
wherein the key generating step includes
an intermediate-key generating step of inputting, with an intermediate-key generating part, a secret key to an encryption function including the round function employed by the encryption processing part and generating an intermediate key, and
an intermediate-key expanding step of taking, with an intermediate-key expanding part, the intermediate key generated by the intermediate-key generating part as an input and generating round keys.

Note that a computer program of the present invention is a computer program that can be provided through storage media, such as recording media including a CD, an FD, and an MO, or communication media, such as a network, which can provide the program in a computer-readable format to, for example, a computer system capable of executing various program codes. By providing such a program in a computer-readable format, processing corresponding to the program can be performed on the computer system.

Further objects, features, and advantageous effects of the present invention will become apparent from the following detailed description of embodiments of the present invention and drawings attached thereto. Note that the system in the present specification refers to a logical assembly of a plurality of apparatuses and is not limited to an assembly in which apparatuses having individual structures are contained in a single housing.

Advantageous Effects

According to a structure of an embodiment of the present invention, a key scheduling part in an encryption processing apparatus that performs common-key blockcipher processing is configured to perform round-key generation processing using an encryption function applied to an encryption processing part. Specifically, a secret key is input to the encryption function including a round function employed in the encryption processing part to generate an intermediate key, and the result of performing bijective transformation based on the intermediate key, the secret key, and the like and the result of performing an exclusive-OR operation on the bijective-transformed data are applied to round keys. With this structure, generation of round keys based on the intermediate key generated using the encryption function whose security has been ensured is performed, thereby making it possible to enhance security, that is, to make analysis of the keys more difficult. At the same time, the structure of the key scheduling part can be simplified by generating keys using the structure of the encryption processing part, thereby making it possible to improve the implementation efficiency.

BRIEF DESCRIPTION OF DRAWINGS

FIG. 17 is a diagram describing round key data generated by the processing performed by the key scheduling part illustrated in FIG. 16.

FIG. 22 is a diagram describing round key data generated by the processing performed by the key scheduling part illustrated in FIG. 21.

FIG. 26 is a diagram describing round key data generated by the processing performed by the key scheduling part illustrated in FIG. 25.

BEST MODES FOR CARRYING OUT THE INVENTION

Figure 1:
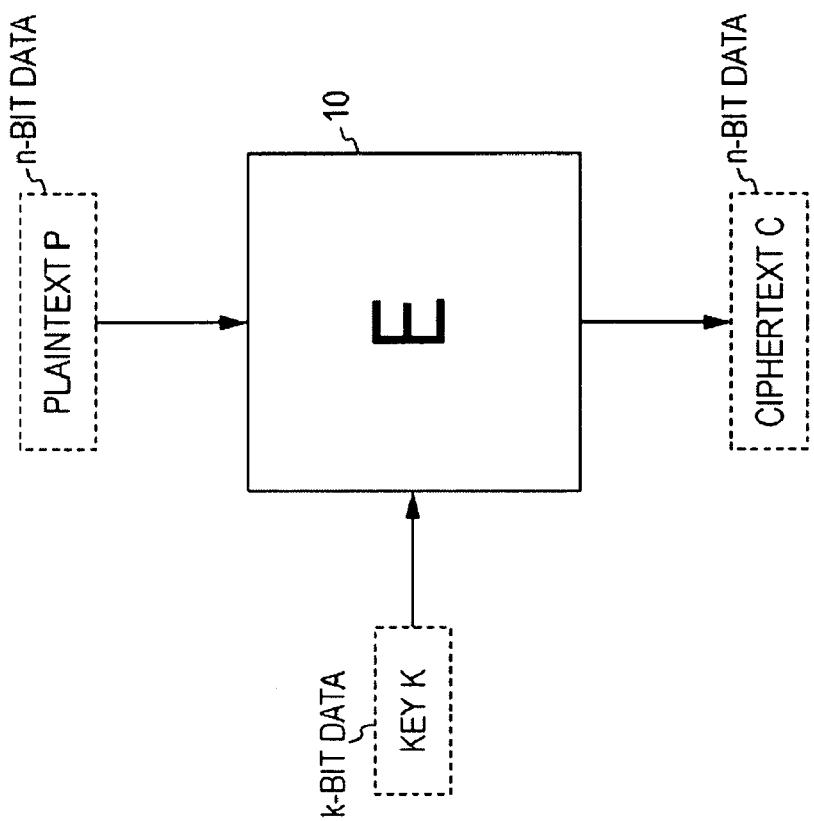
FIG. 1 is a diagram showing the basic structure of a common-key blockcipher algorithm.

An encryption processing apparatus, an encryption processing method, and a computer program according to the present invention will now herein be described in detail below. The description will be given in accordance with the following sections:
1. Outline of common-key blockcipher
2. Outline of intermediate-key generating structure in key scheduling part
   (2-1) Regarding detailed structure of key scheduling part
   (2-2) Regarding various types of intermediate-key generation processing structures
3. Intermediate-key and round-key generation processing and encryption processing structure according to present invention
   (3-1: First Category)
   Exemplary structure of key scheduling part that generates intermediate key based on input of secret key whose bit length is same as block length and generates round keys from generated intermediate key
   (3-1A) Regarding structure example of intermediate-key generating part that achieves enhancement of security against related-key attack by using encryption function E' ensuring immunity against differential attacks in intermediate-key generating part (3-1B) Regarding structure example of intermediate-key expanding part (round-key generating part) that generates round keys based on intermediate key generated by intermediate-key generating part described in above (3-1A), which achieves enhancement of immunity against attacks on encryption (3-1C) Regarding structure example of intermediate-key expanding part (round-key generating part) that generates round keys based on intermediate key generated by intermediate-key generating part described in above (3-1A), which enhances implementation efficiency without sacrificing security (3-2: Second Category)

Exemplary structure of key scheduling part that generates intermediate key based on input of secret key whose bit length can be up to twice block length and generates round keys from generated intermediate key (3-2A) Regarding structure of key scheduling part having advantages of above (3-1A to C)

(3-2B) Regarding structure of key scheduling part having advantages of above (3-1A to C) and capable of performing processing faster than above (3-2A)

4. Exemplary structure of encryption processing apparatus

[1. Outline of Common-Key Blockcipher]

First, the outline of common-key blockciphers which can be applied to the present invention will be described. In this specification, common-key blockciphers (hereinafter called blockciphers) are those defined below.

A blockcipher takes plaintext P and a key K as inputs and outputs ciphertext C. The bit length of plaintext and ciphertext is referred to as a block size, which is denoted herein by n. Although n can take any integer, generally, n is a predetermined value for each blockcipher algorithm. A blockcipher whose block length is n may be referred to as an n-bit blockcipher.

The bit length of a key is denoted by k. The key can take any integer. A common-key blockcipher algorithm is to handle one or plural key sizes. For example, one blockcipher algorithm A has block size n=128 and may be configured to handle various key sizes, i.e., bit length k=128, k=192, or k=256.

Individual bit sizes of plaintext [P], ciphertext [C], and a key [K] are indicated as follows:

plaintext P: n bits
ciphertext C: n bits
key K: k bits

An n-bit common-key blockcipher algorithm E capable of handling a k-bit key length is illustrated in FIG. 1. As illustrated in FIG. 1, a common-key blockcipher processing part E10 takes n-bit plaintext P and a k-bit key K as inputs, executes a predetermined encryption algorithm, and outputs n-bit ciphertext C. Note that, although encryption processing of generating ciphertext from plaintext is illustrated in FIG. 1, decryption processing of generating plaintext from ciphertext employs the similar common-key blockcipher processing part E10 to perform decryption processing by changing the sequence such as the order of inputting keys or the like.

Figure 2:
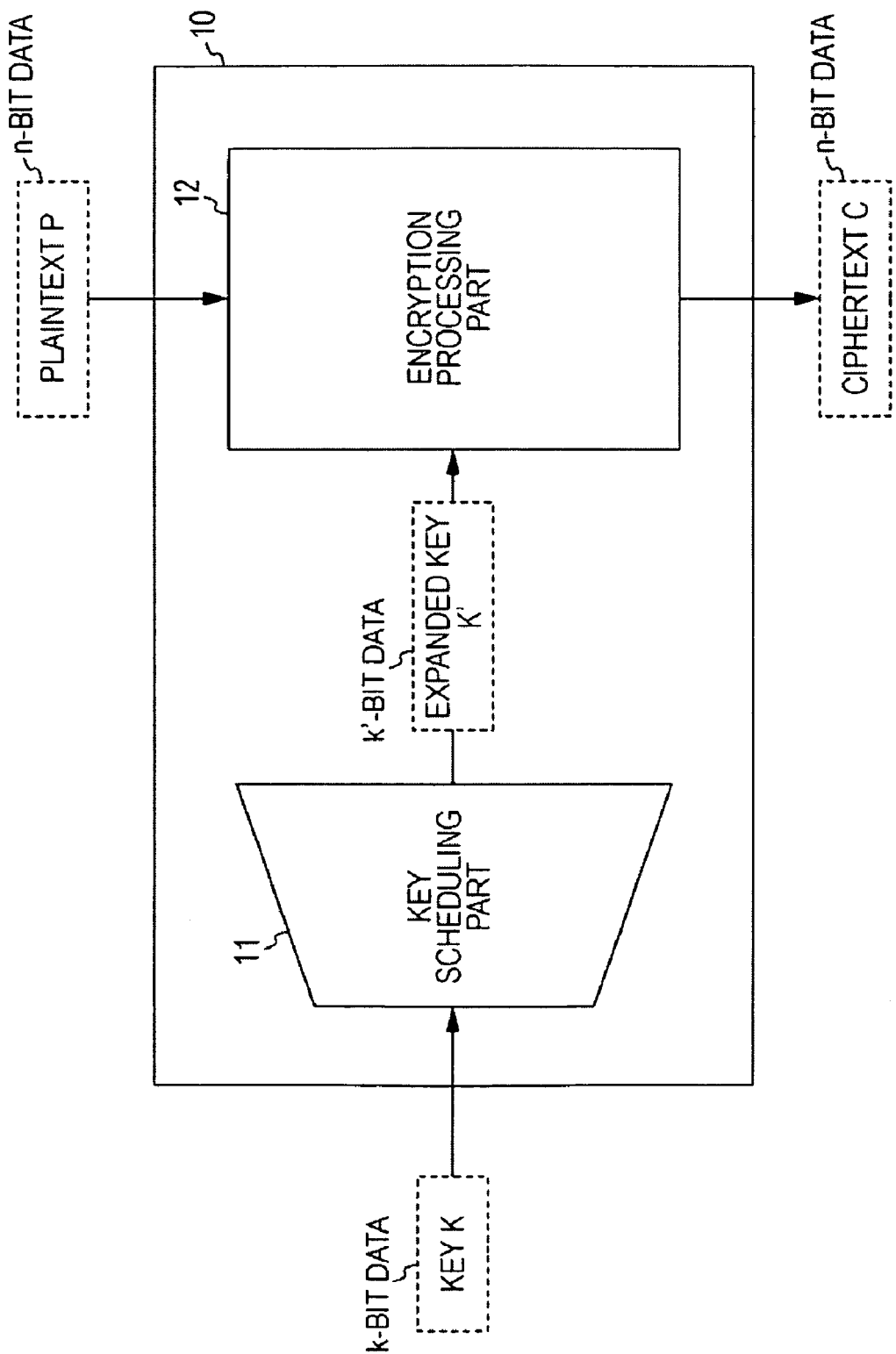
FIG. 2 is a diagram describing the internal structure of a common-key blockcipher processing part E10 illustrated in FIG. 1.

With reference to FIG. 2, the internal structure of the common-key blockcipher processing part E10 illustrated in FIG. 1 will be described. A blockcipher can be regarded as having two separate parts. One part is a key scheduling part 11 which takes a key K as an input, expands the bit length of the input key K by performing predetermined steps, and outputs an expanded key K' (bit length k'), and the other part is an encryption processing part 12 which performs data transformation for generating ciphertext C by receiving plaintext P and the expanded key K' which is input from the key scheduling part 11 and performing encryption processing by receiving the plaintext P and applying the expanded key K'. Note that, as has been described above, the encryption processing part 12 may be applicable to data decryption processing of transforming ciphertext back to plaintext.

Figure 3:
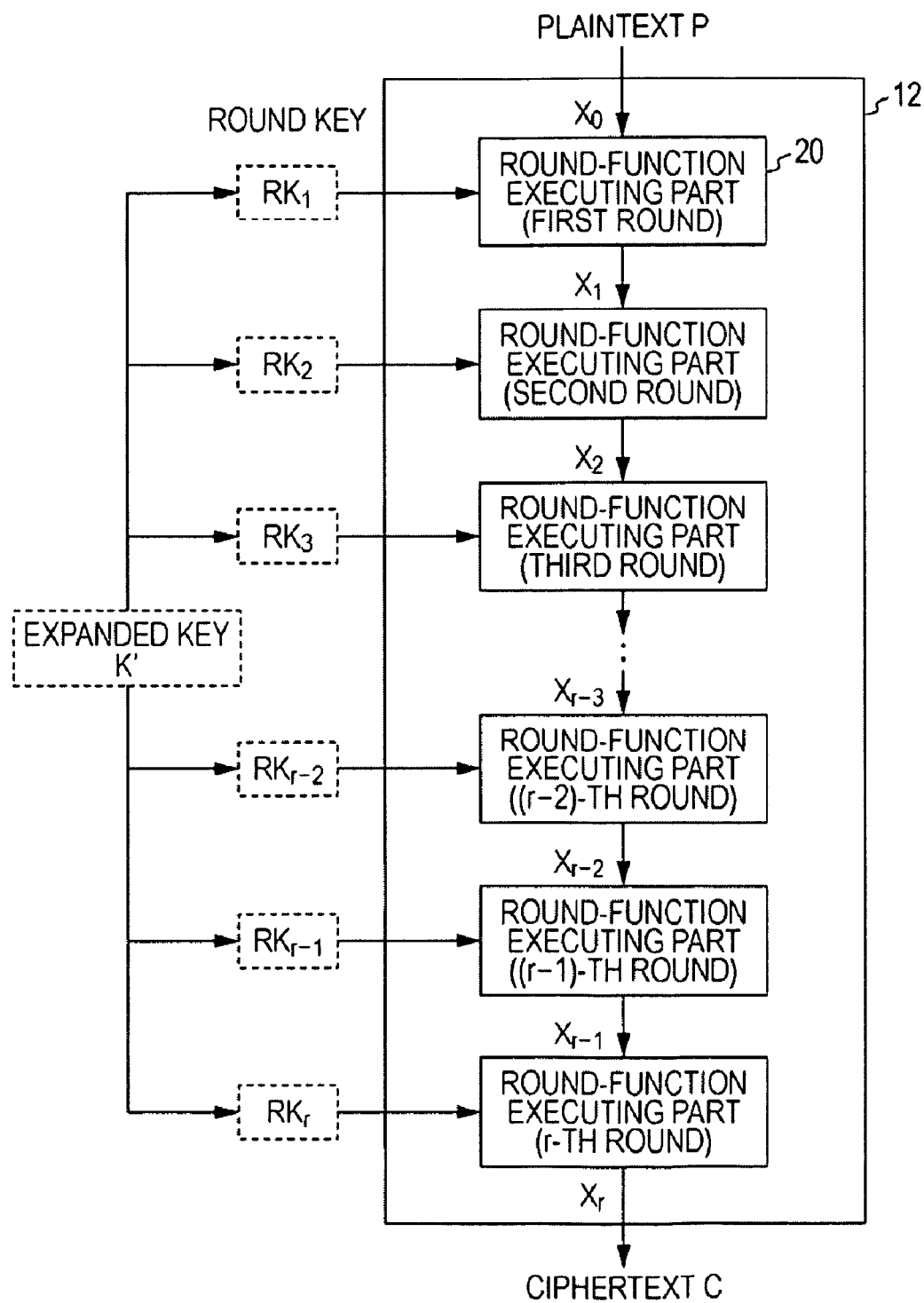
FIG. 3 is a diagram describing the detailed structure of an encryption processing part 12 illustrated in FIG. 2.

Next, with reference to FIG. 3, the detailed structure of the encryption processing part 12 illustrated in FIG. 2 will be described. As illustrated in FIG. 3, the encryption processing part 12 is configured to repeatedly perform data transformation to which round-function executing parts 20 are applied. That is, the encryption processing part 12 can be separated into units for processing that are the round-function executing parts 20. Each round-function executing part 20 takes two pieces of data as inputs, an output $X_i$ of the round-function executing part at the previous stage and a round key $RK_i$ generated on the basis of the expanded key, performs data transformation processing therein, and outputs output data $X_{i+1}$ to the next round-function executing part. Note that an input to the first round is plaintext or initialization processing data for plaintext. Also, an output from the last round is ciphertext.

In the example illustrated in FIG. 3, the encryption processing part 12 has r round-function executing parts 20 and is configured to repeatedly perform data transformation r times in the round-function executing parts to generate ciphertext. The number of times a round function is executed is referred to as the number of rounds. In the illustrated example, the number of rounds is r.

Input data $X_i$ of each round-function executing part is n-bit data under encryption. An output $X_{i+1}$ of a round function in a certain round is supplied as an input to the next round. As the other input data of each round-function executing part, data based on the expanded key K' output from the key scheduling is used. A key input to each round-function executing part and applied to execute a round function is referred to as a round key. In the diagram, a round key applied to the i-th round is denoted by $RK_1$. The expanded key K' is configured as, for example, concatenated data of round keys $RK_1$ to $RK_r$ for r rounds.

The structure illustrated in FIG. 3 is the structure of the encryption processing part 12 in which input data to the first round, viewed from the input side of the encryption processing part 12, is denoted by $X_o$, data output from the i-th round function is denoted by $X_i$, and a round key is denoted by $RK_i$. Note that, in the encryption processing part 12, for example, by setting the application sequence of applied round keys to be opposite from that in the encryption processing, the encryption processing part 12 can be constructed to take ciphertext as an input and output decrypted text.

The round-function executing parts 20 of the encryption processing part 12 illustrated in FIG. 3 may have various forms. Round functions can be classified according to structures adopted by respective encryption algorithms. Representative structures include the following:

(a) SPN (Substitution Permutation Network) structure;
(b) Feistel structure; and
(c) Generalized Feistel structure.

Figure 4:
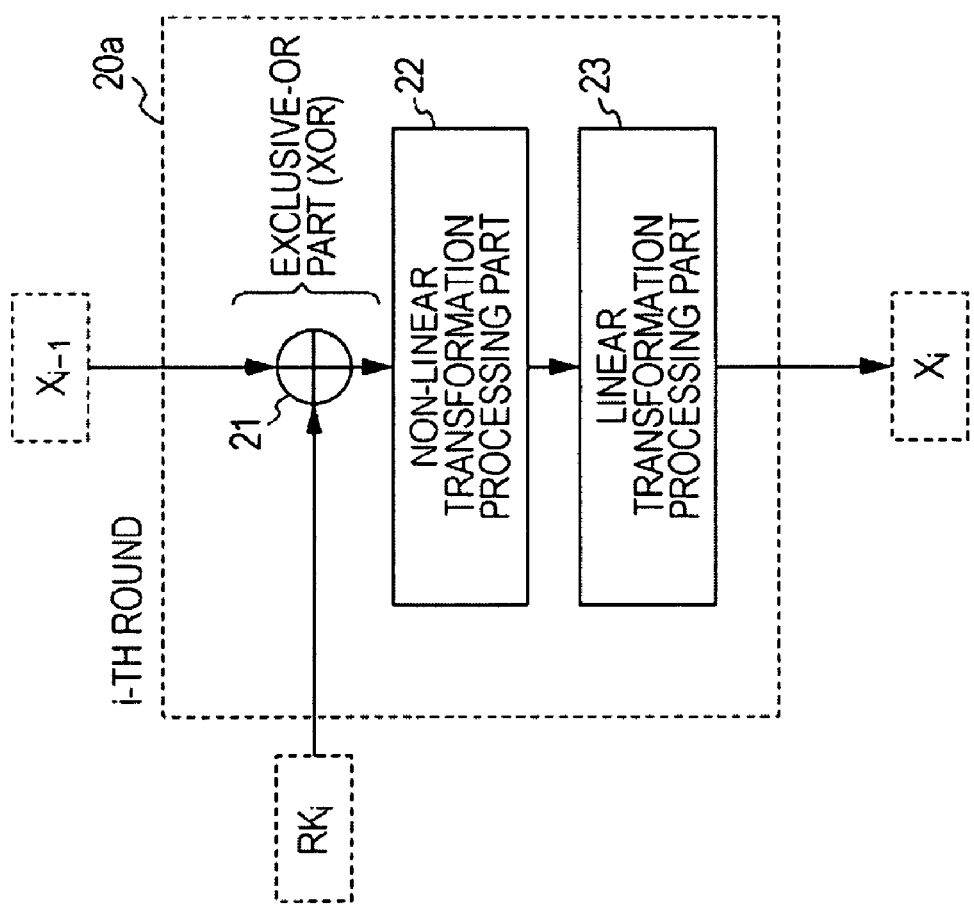
FIG. 4 is a diagram describing an SPN-structure round function serving as a structure example of a round-function executing part.
Figure 5:
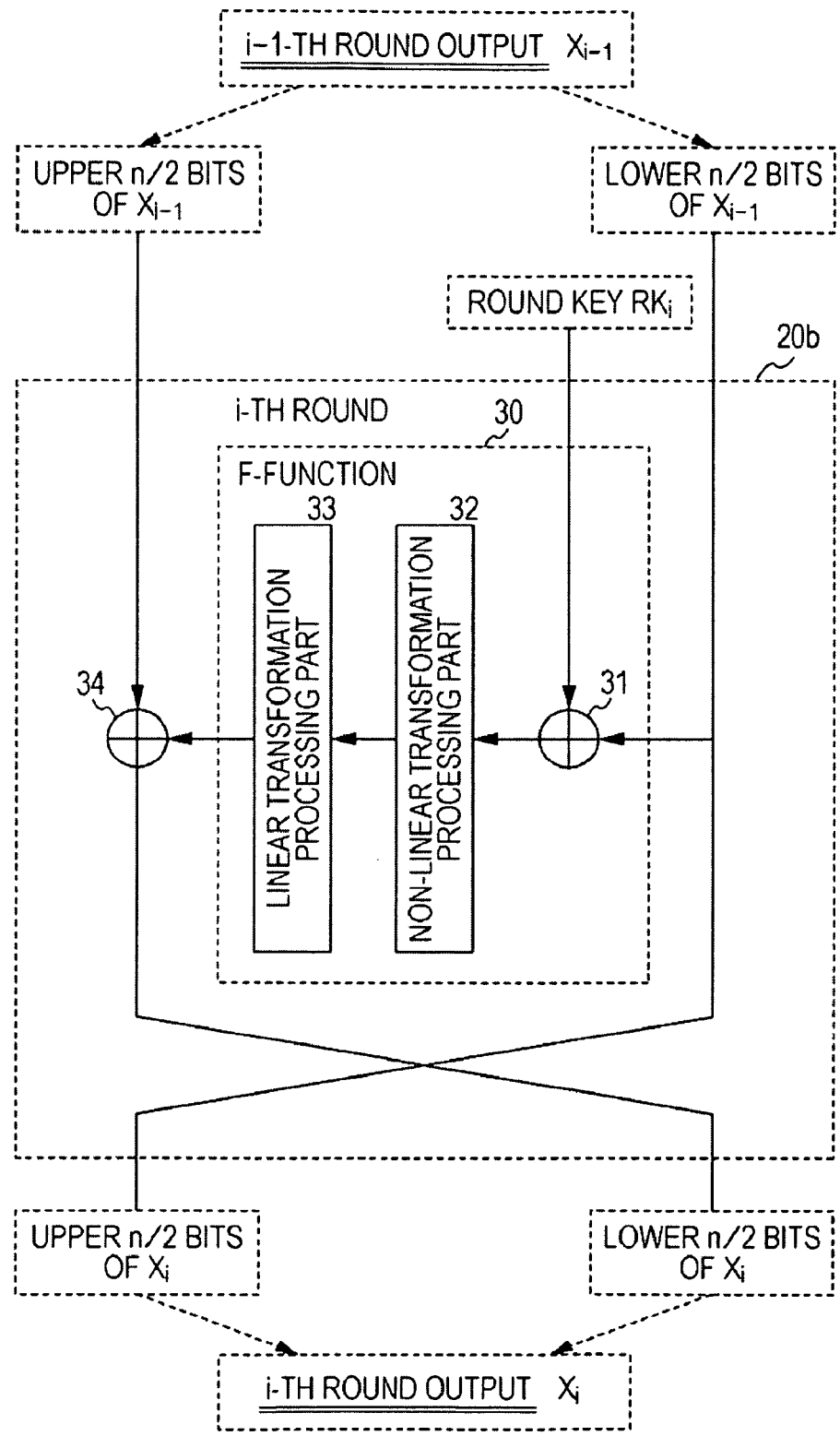
FIG. 5 is a diagram describing a Feistel structure serving as a structure example of the round-function executing part.

These specific structures will now be described below with reference to FIG. 4 through FIG. 6.

(a) SPN-Structure Round Function

First of all, with reference to FIG. 4, an SPN-structure round function serving as a structure example of the round-function executing part 20 will be described. An SPN-structure round-function executing part 20a has a so-called SP-type structure in which a non-linear transformation layer (S layer) and a linear transformation layer (P layer) are connected. As illustrated in FIG. 4, the SPN-structure round-function executing part 20a is constructed of an exclusive-OR calculating part 21 that performs an exclusive-OR (EXOR) operation on the entire n-bit input data and a round key, a non-linear transformation processing part 22 that takes the operation result obtained by the exclusive-OR calculating part 21 as an input and performs non-linear transformation of the input data, a linear transformation processing part 23 that takes the non-linear transformation processing result obtained by the non-linear transformation processing part 22 as an input and performs linear transformation processing of the input data, and the like. The linear transformation processing result obtained by the linear transformation processing part 23 is output to the next round. The output of the last round is ciphertext. Note that, although the processing sequence of the exclusive-OR calculating part 21, the non-linear transformation processing part 22, and the linear transformation processing part 23 is illustrated in the example shown in FIG. 4, the sequence of the processing parts is not limited thereto, and the processing may be performed in other sequences.

(b) Feistel Structure

Next, with reference to FIG. 5, a Feistel structure serving as a structure example of the round-function executing part 20 will be described. A Feistel structure performs, as illustrated in FIG. 5, the processing by splitting n-bit input data from the previous round (input text in the first round) into two equal pieces of n/2-bit data and exchanging the two pieces of data for each other on a round-by-round basis.

In the processing to which a round-function executing part 20b with a Feistel-structure is applied, as illustrated in the drawing, one piece of n/2-bit data and a round key are input to an F-function part 30. The F-function part 30 has, as in the above-mentioned SPN structure, a so-called SP-type structure in which a non-linear transformation layer (S layer) and a linear transformation layer (P layer) are connected.

One piece of n/2-bit data from the previous round and a round key are input to an exclusive-OR calculating part 31 of the F-function part 30 and exclusive-or (EXOR) processing is performed. Further, this result data is input to a non-linear transformation processing part 32 to be non-linearly transformed. Further, the non-linear transformation result is input to a linear transformation processing part 33 to be linearly transformed. The linear transformation result is output as the result data of processing of the F-function.

Further, the F-function output and the other piece of n/2-bit data input from the previous round are input to an exclusive-OR calculating part 34 and an exclusive-OR operation (EXOR) is executed. The execution result is set as an input to an F-function of the next round. Note that the n/2-bits set as an input to the F-function of the i-th round illustrated in the diagram are applied to an exclusive-OR operation with the output of the F-function of the next round. In this manner, the Feistel structure executes data transformation processing to which F functions are applied while exchanging the inputs for each other on a round-by-round basis.

(c) Generalized Feistel Structure

Next, with reference to FIG. 6, a generalized Feistel structure serving as a structure example of the round-function executing part 20 will be described. The Feistel structure which has been described above with reference to FIG. 5 performs the processing by splitting n-bit plaintext into two equal pieces having n/2 bits. That is, the number of divisions d is two in the processing. Note that the number of divisions may also be referred to as the number of data lines.

A generalized Feistel structure sets the number of data lines (the number of divisions) d to any integer greater than or equal to two. Various generalized Feistel structures can be defined according to the value of the number of data lines (the number of divisions) d. In the example illustrated in FIG. 6, the number of data lines (the number of divisions) d is four, and n/4-bit data is input to each data line. In each round, one or more F-functions serving as round functions are executed. The illustrated example is a structure example of performing round operations using two F-function parts in each round.

The structure of F-function parts 41 and 42 is similar to the structure of the F-function part 30 described above with reference to FIG. 5. The F-function parts 41 and 42 are configured to perform an exclusive-OR operation on a round key and an input value, non-linear transformation processing, and linear transformation processing. Note that a round key input to each of the F-function parts is adjusted so that the number of bits of the round key coincides with that of input bits. In the illustrated example, the number of bits of round keys input to the respective F-function parts 41 and 42 is n/4 bits. These keys are generated by bit-segmenting each of round keys constituting an expanded key. Note that, let d be the number of data lines (the number of divisions), then data input to each line is n/d bits, and the number of bits of a key input to each F-function is adjusted to n/d bits.

Figure 6:
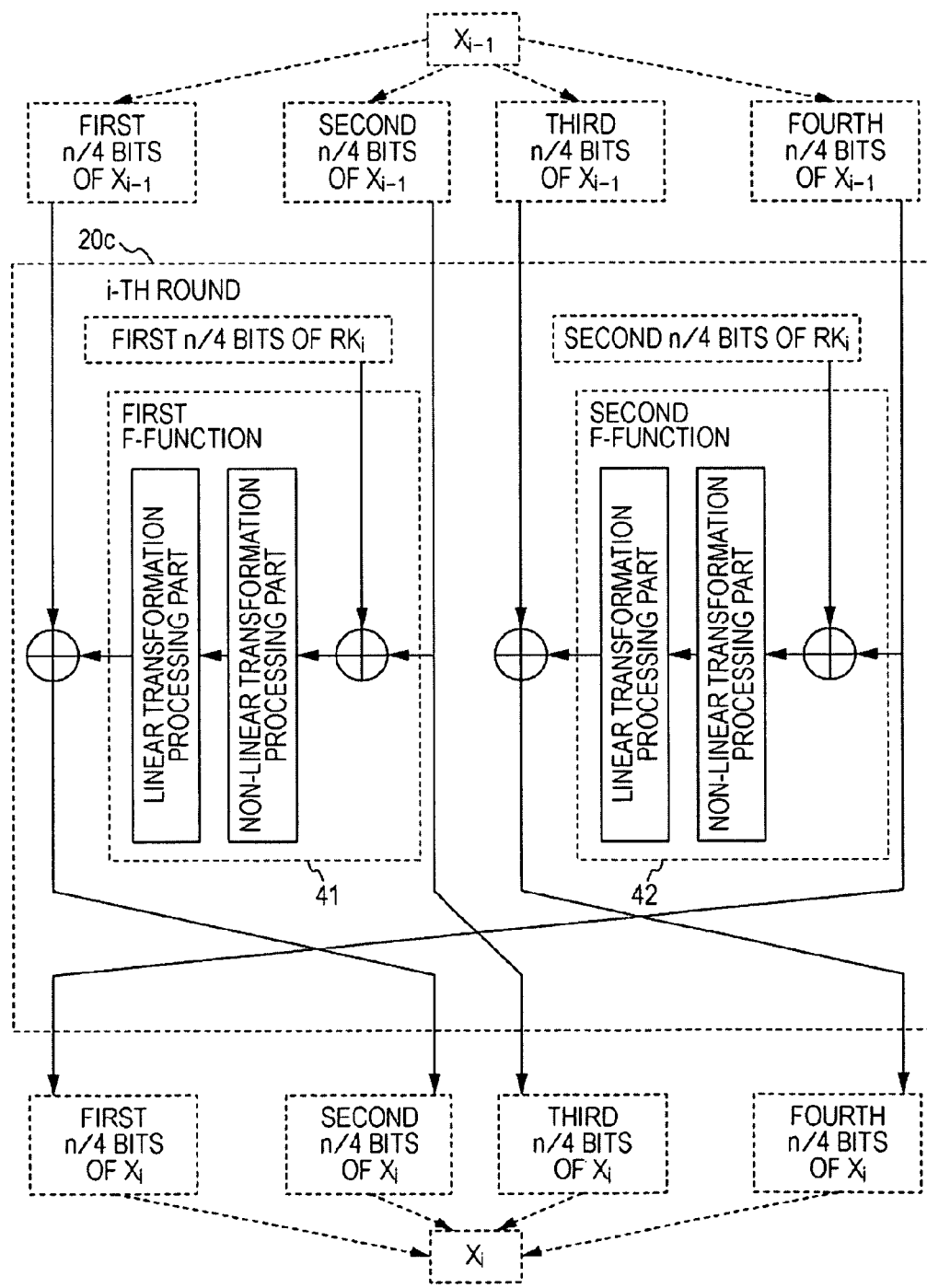
FIG. 6 is a diagram describing a generalized Feistel structure serving as a structure example of the round-function executing part.

Note that the generalized Feistel structure illustrated in FIG. 6 is a structure example in which, let d be the number of data lines (the number of divisions), then d/2 F-functions are executed in parallel to one another in each round. A generalized Feistel structure can be configured to execute at least one and less than or equal to d/2 F-functions in each round.

As has been described with reference to FIG. 4 through FIG. 6, the round-function executing parts 20 of the encryption processing part 12 in a common-key blockcipher can have one of the following structures:

(a) SPN (Substitution Permutation Network) structure;
(b) Feistel structure; and
(c) Generalized Feistel structure.

These round-function executing parts each have a so-called SP-type structure in which a non-linear transformation layer (S layer) and a linear transformation layer (P layer) are connected. That is, each round-function executing part has a non-linear transformation processing part that performs non-linear transformation processing and a linear transformation processing part that performs linear transformation processing. These transformation processing structures will be described below.

(Non-linear Transformation Processing Part)

Figure 7:
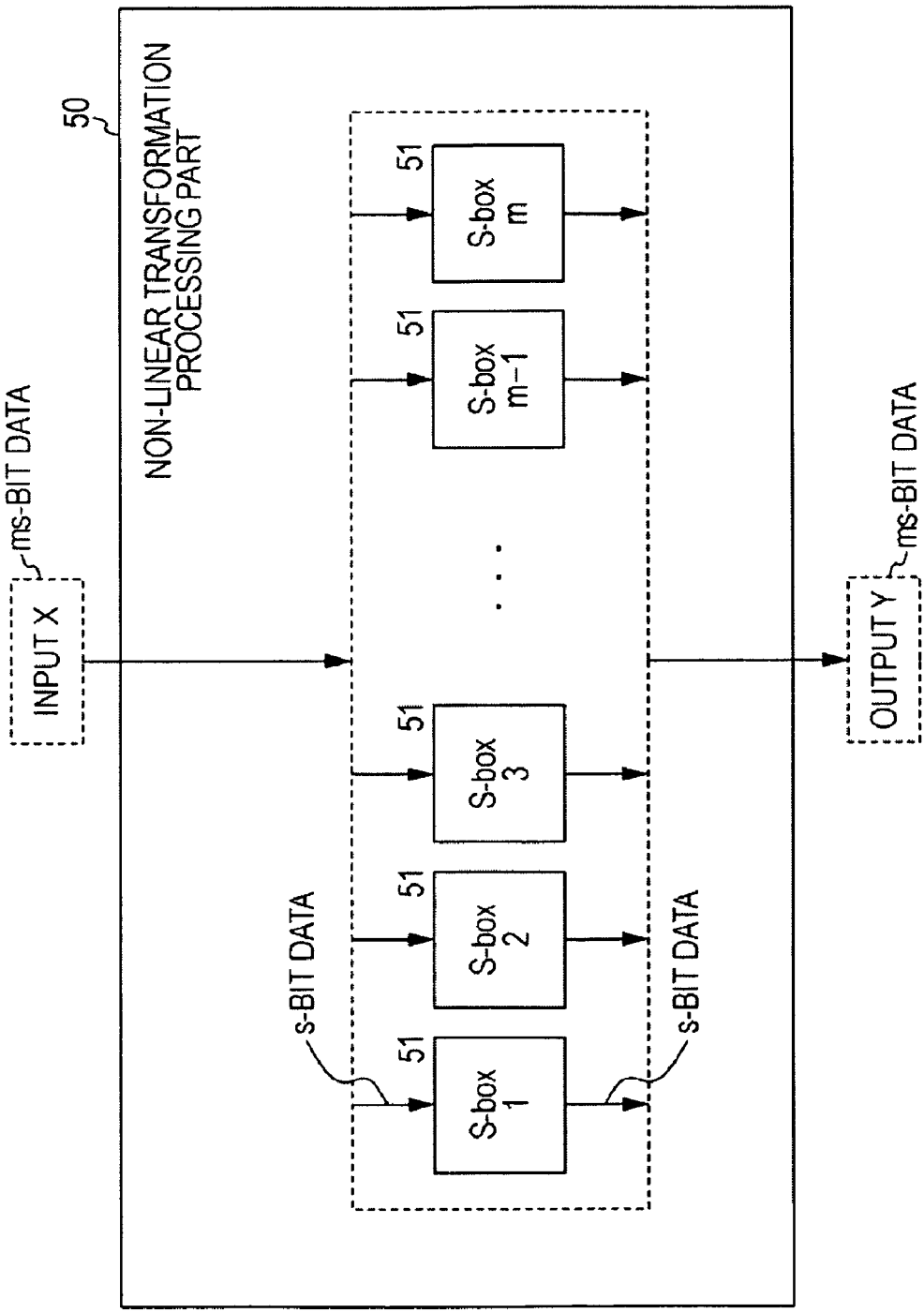
FIG. 7 is a diagram describing a specific example of a non-linear transformation processing part.

With reference to FIG. 7, a specific example of a non-linear transformation processing part will be described. As illustrated in FIG. 7, a non-linear transformation processing part 50 includes, specifically, an array of m non-linear transformation tables referred to as S-boxes 51, each of which takes s bits as an input and generates s bits as an output, in which ms-bit input data is divided into equal pieces of s-bit data, and the pieces of data are input to the respective S-boxes 51 and transformed. Each of the S-boxes 51 performs non-linear transformation processing by applying, for example, a transformation table.

There is a tendency that, as the size of input data increases, so does the cost of implementation. In order to avoid that, in many cases, as illustrated in FIG. 7, a structure of dividing data X to be processed into plural pieces and performing non-linear transformation of each piece is used. For example, if the input size is ms bits, the input data is divided into m pieces of s-bit data, and the m pieces of s-bit data are input to the respective m S-boxes 51 to be non-linearly transformed by applying, for example, a transformation table, and m pieces of s-bit output data are combined to obtain an ms-bit non-linear transformation result.

(Linear Transformation Processing Part)

Figure 8:
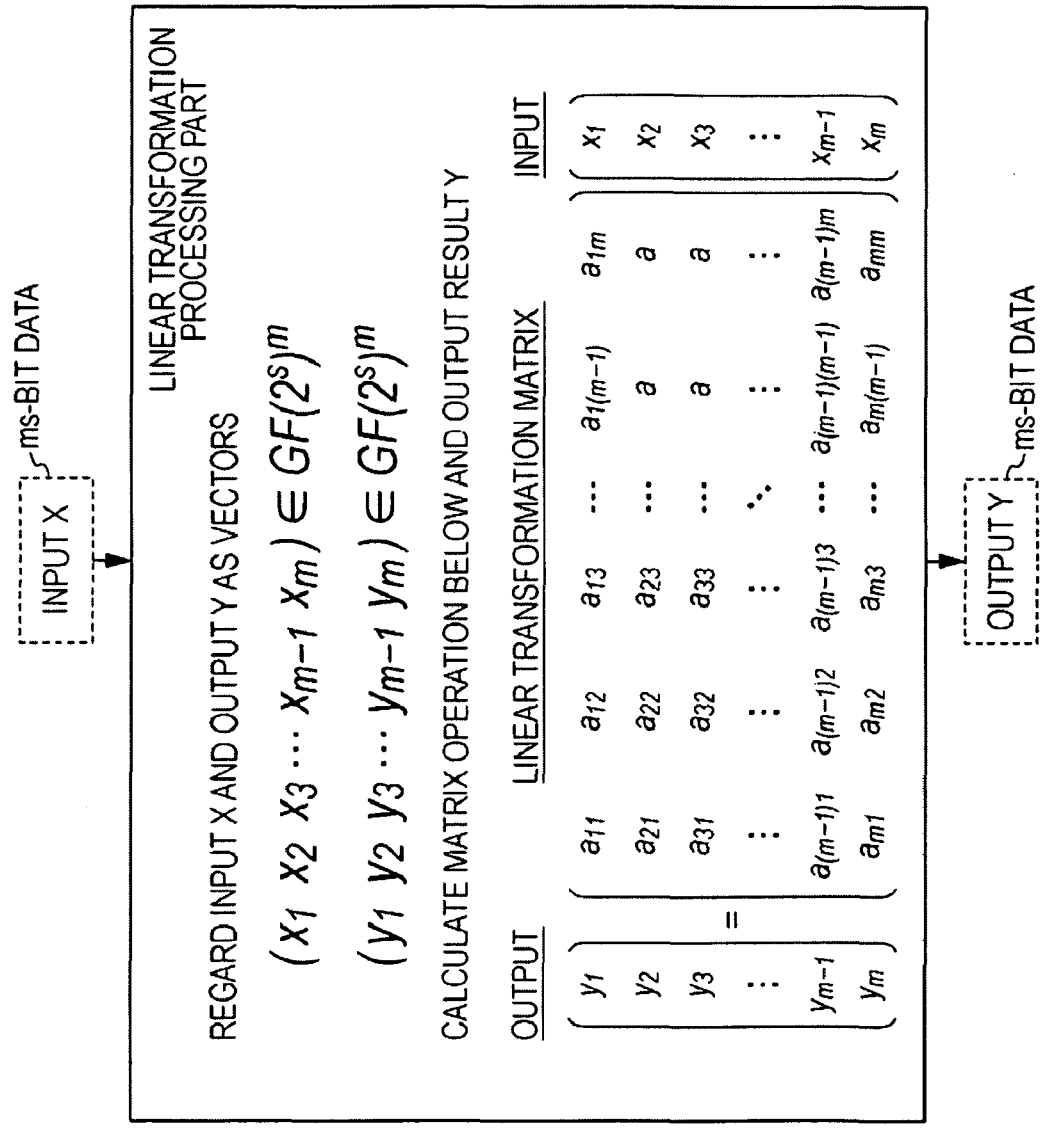
FIG. 8 is a diagram describing a specific example of a linear transformation processing part.

With reference to FIG. 8, a specific example of a linear transformation processing part will be described. A linear transformation processing part takes as an input an input value, such as an ms-bit output value which is output data from the S-boxes as an input value X, applies linear transformation to this input, and outputs an ms-bit result. The linear transformation processing performs linear transformation processing, such as permutation processing of the positions of input bits, and outputs an ms-bit output value Y. The linear transformation processing applies, for example, a linear transformation matrix to the input and performs permutation processing of the positions of the input bits. An example of the matrix is a linear transformation matrix illustrated in FIG. 8.

The elements of the linear transformation matrix applied to the linear transformation processing part can be generally configured as a matrix applying various representations, such as elements in the extension field $GF(2^8)$ or elements in the field $GF(2)$. FIG. 8 illustrates a structure example of a linear transformation processing part which takes an ms-bit input and generates an ms-bit output and which is defined by an m×m matrix defined over $GF(2^s)$.

[2. Outline of Intermediate-key Generating Structure in Key Scheduling Part]

As has been described above, a common-key blockcipher is configured to perform encryption processing by repeatedly executing a round function. The common-key blockcipher processing has a problem of the leakage of keys due to cryptanalysis. The fact that the keys can be analyzed easily by cryptanalysis means that the cipher has low security, leading to a serious problem in applications.

As is clear from the foregoing description, the common-key blockcipher performs the processing by applying round keys generated on the basis of an expanded key in respective rounds. A possible attack on encryption may be an attack involving a procedure in which an expanded key is decrypted by analyzing the round keys and further a secret key which is the original data of the expanded key is analyzed. Firstly, before the description of the structure of the present invention, the outline of an intermediate-key generating structure of a key scheduling part will be described.

The description will be given in accordance with the following sections:

(2-1) Regarding detailed structure of key scheduling part
(2-2) Regarding various types of intermediate-key generation processing structures
(2-1) Regarding Detailed Structure of Key Scheduling Part First, the detailed structure of a key scheduling part will be described. As has been described above with reference to FIG. 2 by way of example, a key scheduling part of a common-key blockcipher expands the bit length of an input key K to output an expanded key K' (bit length k') and executes a round function by applying a round key $RK_i$ generated on the basis of the expanded key.

The key scheduling part takes, for example, a k-bit secret key K as an input and generates a k'-bit expanded key (round keys) K' by performing predetermined transformation. In general, k<k', and, for example, a common-key blockcipher AES performs expanded-key generation processing in which, if the number of bits of the secret key K is 128,
then, the number of bits of the expanded key (round keys) K' is 1408(=128×11).

Also, a common-key blockcipher Camellia performs expanded-key generation processing in which, if the number of bits of the secret key K is 128,
then, the number of bits of the expanded key (round keys) K' is 1664(=128×13).

Note that, since the expanded key is input to round functions of an encryption processing part, the expanded key is also called round keys. In addition, an initial key applied to an operation (exclusive-OR (EXOR)) prior to the first round function and a last key applied to an operation (exclusive-OR (EXOR)) subsequent to the last round function may also be included in round keys. These keys are also generated on the basis of the expanded key generated by the key scheduling part.

Figure 9:
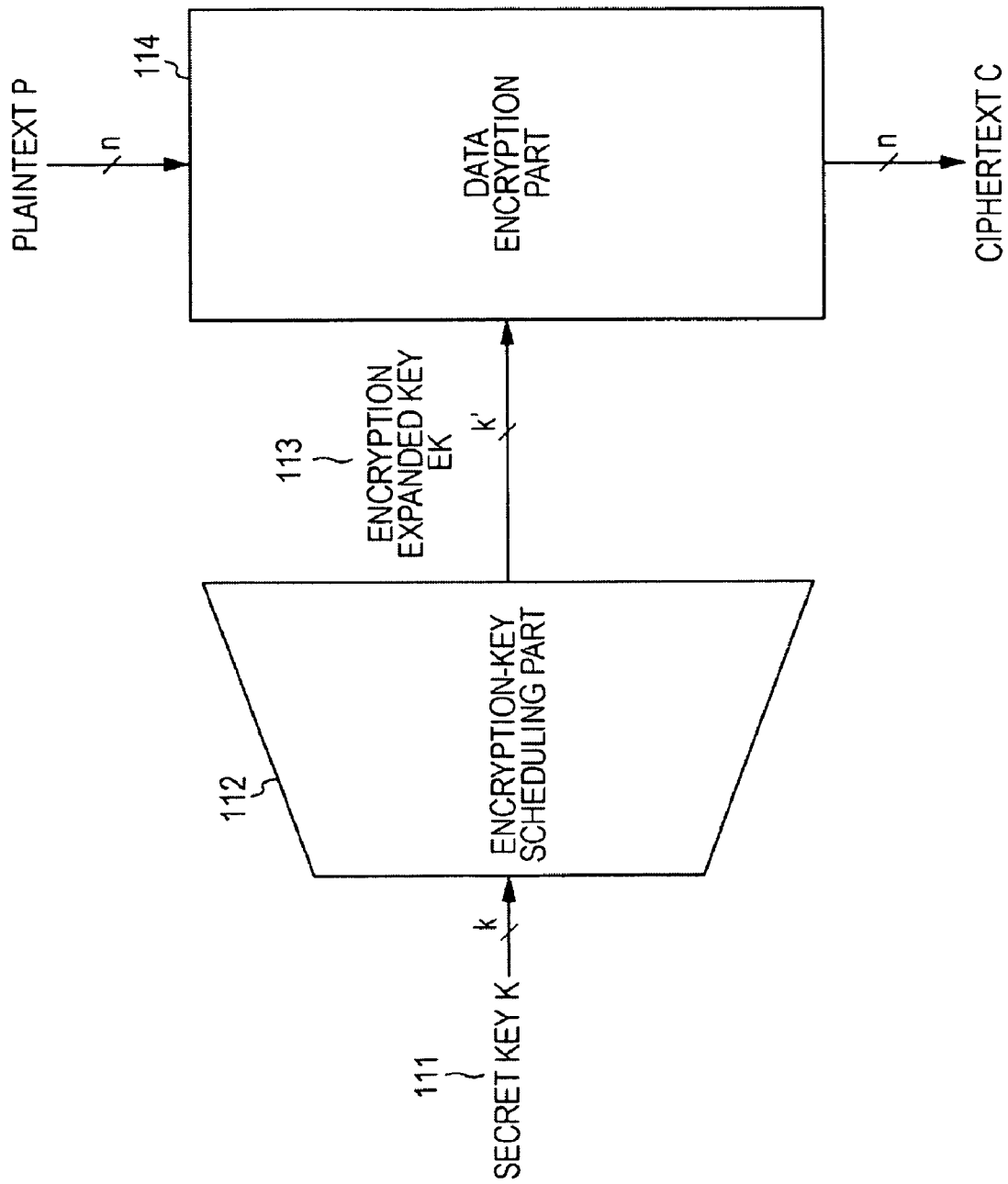
FIG. 9 is a diagram describing the structure of and processing performed by an encryption-key scheduling part applied to encryption processing.
Figure 10:
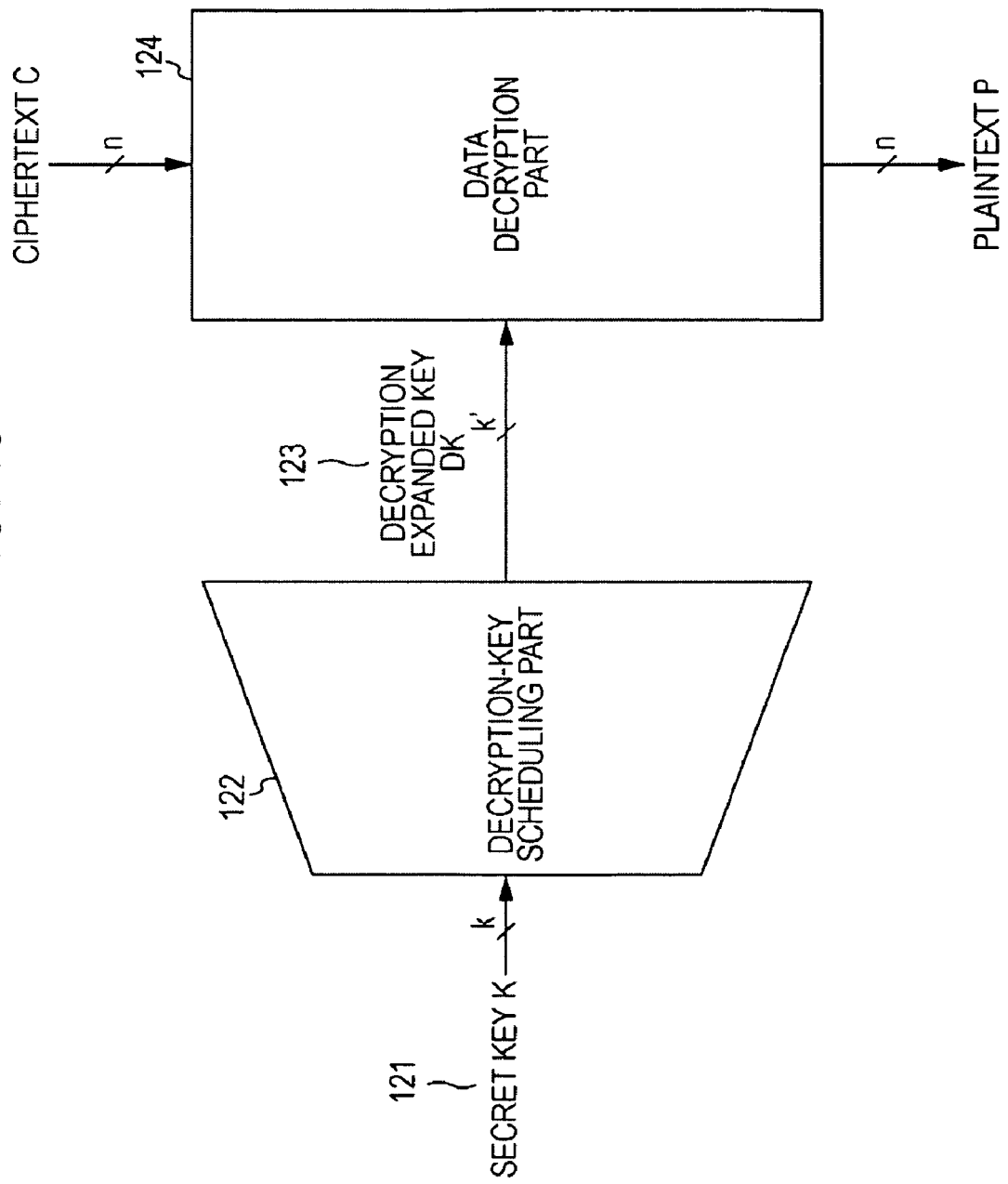
FIG. 10 is a diagram describing the structure of and processing performed by an encryption-key scheduling part applied to decryption processing.

In general, there are an encryption-key scheduling part that generates an encryption expanded key applied to encryption processing, and a decryption-key scheduling part that generates a decryption expanded key applied to decryption processing. The encryption-key scheduling part and decryption-key scheduling part generate expanded keys corresponding to their processing. With reference to FIG. 9 and FIG. 10, the structure of and processing performed by the encryption-key scheduling part and decryption-key scheduling part applied to encryption processing and decryption processing, respectively, will be described.

For example, FIG. 9 illustrates an encryption structure that takes plaintext P as an input, performs a blockcipher using round functions, and outputs ciphertext C. For example, a k-bit secret key [K] 111 is input to an encryption-key scheduling part 112, and data transformation of the k-bit secret key 111 is performed in accordance with a predetermined algorithm, such as bit expansion processing, to generate a k'-bit encryption expanded key EK 113 serving as data for round-key generation. Further, round keys are generated on the basis of the encryption expanded key EK 113, and the round keys are supplied to a data encryption part 114. The data encryption part 114 performs encryption based on data transformation by applying the round keys in round functions for r rounds and generates ciphertext C from plaintext P.

FIG. 10 shows a decryption processing structure. A k-bit secret key [K] 121 is input to a decryption-key scheduling part 122, and data transformation of the k-bit secret key 121 is performed in accordance with a predetermined algorithm, such as bit expansion processing, to generate a k'-bit decryption expanded key DK 123 serving as data for round-key generation. Note that the same key as the secret key [K] 111 illustrated in FIG. 9, which is applied to encryption processing, is applied as the secret key [K] 121. Further, round keys are generated on the basis of the decryption expanded key DK 123, and the round keys are supplied to a data decryption part 124. The data decryption part 124 performs decryption based on data transformation by applying the round keys in round functions for r rounds and generates plaintext P from ciphertext C.

Figure 11:
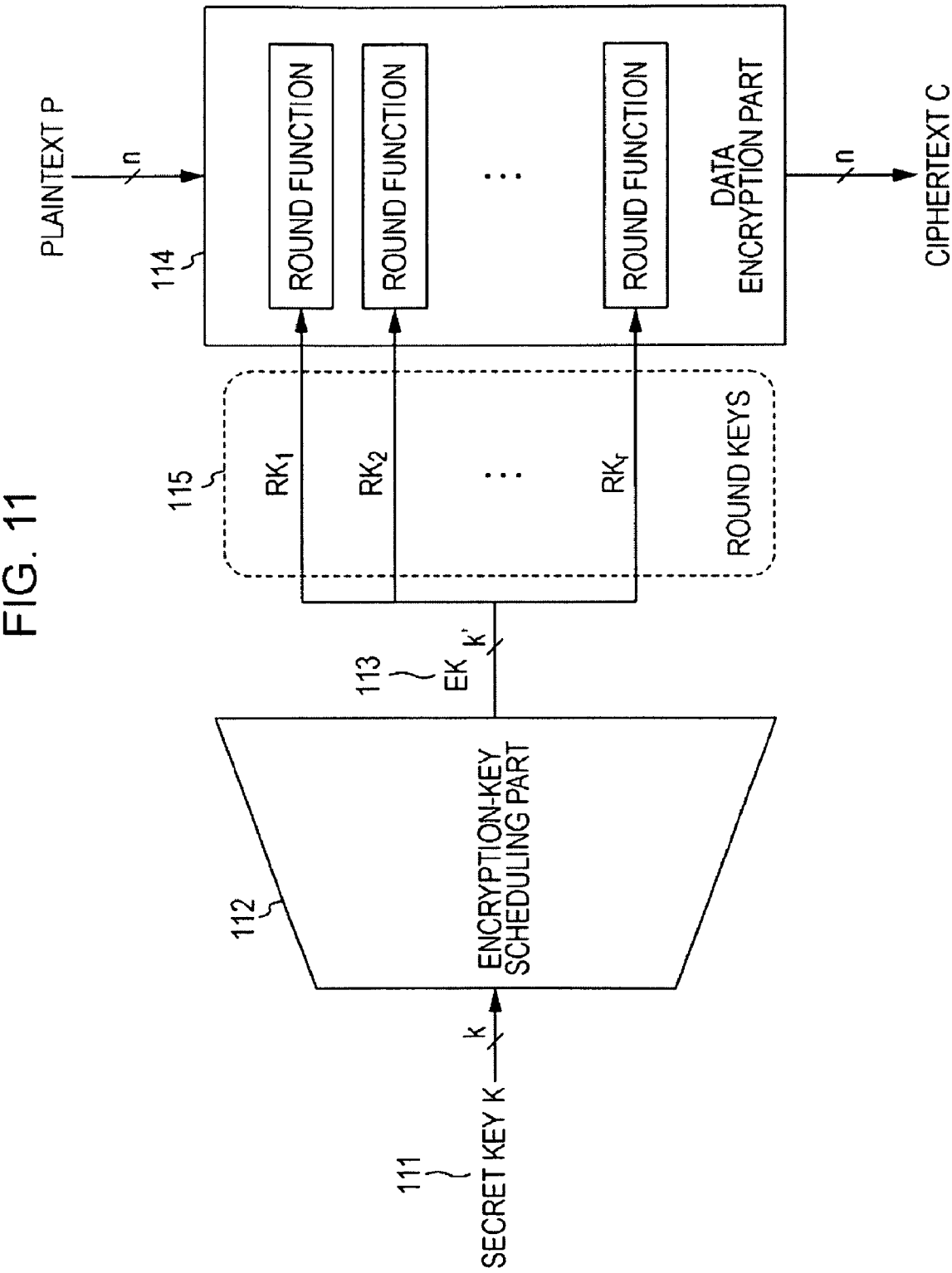
FIG. 11 is a diagram describing a structure example of a key scheduling part that performs round-key generation processing in encryption processing.

More specifically, each of the encryption expanded key EK and the decryption expanded key DK is divided into round keys $RK_i$ (i is a round number), and the round keys $RK_i$ are inserted into respective round functions of the data encryption part and the data encryption part. The association between the encryption expanded key EK and round keys is illustrated in FIG. 11. The data encryption part 114 is configured to perform a blockcipher in which the number of rounds is, for example, r. In the case of encryption, round keys 115 ($RK_1$, $RK_2$, ..., $RK_{r-1}$, $RK_r$) generated on the basis of the encryption expanded key EK 113 are sequentially input to first to r-th round functions, respectively, and the round functions (F-functions) are executed. In decryption processing, the sequence of the keys is reversed, and the round functions are executed.

Note that round keys may be applied to operations other than the round functions illustrated in FIG. 11. For example, processing called key-whitening is performed in an AES (Advanced Encryption Standard) algorithm, which is known as a common-key blockcipher algorithm. That is, a round key is input after the last round function, and an exclusive-OR operation (EXOR) is performed on the round key and processing data. Also in Camellia, which is known as a common-key blockcipher algorithm, as key-whitening, round keys are input before the first round function and after the last round function, and exclusive-OR operations (EXOR) are performed on the round keys and processing data.

A key-whitening key refers to a round key applied to an exclusive-OR operation performed before the first round function or after the last round function. Also, a round key (key-whitening key) used before the first round function is also called an initial key, and a round key (key-whitening key) used after the last round function is also called a last key.

Ideal characteristics that round keys should have in order to have a structure that enhances the immunity against encryption attacks based on key analysis, that is, enhances security by making the analysis of keys more difficult, are as follows:

(a) no equivalent keys exist; and (b) have sufficient immunity against a related-key attack.

Here, strictly speaking, equivalent keys refer to a pair of secret keys $K_1$ and $K_2$ ($K_1 \neq K_2$) which satisfy $E(RK_1)=E(RK_2)$ even in the case where P is changed. Note that an encryption function E is applied to plaintext P to encrypt the plaintext P using a secret key K, and the encryption result C is C=E(RK).

$$E(RK_1)=E(RK_2)$$

means that pieces of encrypted data generated by encrypting any plaintext P using different secret keys $K_1$ and $K_2$ ($K_1 \neq K_2$) are equal.

If such equivalent keys exist, the computational complexity of performing a brute force attack to analyze a secret key is reduced, resulting in lower security. Therefore, it is preferable to prove the non-existence of such equivalent keys; strictly speaking, however, it is difficult to prove the non-existence of equivalent keys. Therefore, in the following description, a pair of different secret keys $K_1$ and $K_2$ having the equal expanded key K' is redefined as equivalent keys, and the non-existence of these equivalent keys will be discussed.

Also, a related-key attack is an attacking process of estimating an unknown key K using the relation between ciphertext C encrypted using the unknown key K and ciphertext C' encrypted using a key having a certain relation with K:

$$K'=f(K)$$

An attacker selects the relation between K and K' so that an attack can be successful. In many cases, a function f indicating the relation between K and K' exhibits a certain difference. That is, in the case where K' satisfying the exclusive-OR operation on K and K' $K(EXOR)K'=\Delta K$ is input, if there is an obvious difference $\Delta RK(=RK(EXOR)RK')$ between an expanded key RK generated from K and an expanded key RK' generated from K', an attack may be highly successful. In contrast, it can be said that an attack may be unsuccessful if data having a strong relation between RK and RK' is difficult to be formed regardless of any differences between K and K'. Note that A(EXOR)B denotes an exclusive-OR operation on A and B.

Further, the key scheduling part is necessary to have the following implementation characteristics:

(1) easy to implement;

(2) setup time for generating an expanded key from a secret key is short;

(3) making the encryption-key scheduling part and the decryption-key scheduling part common as much as possible;

(4) making the data encryption part and the data decryption part common as much as possible; and (5) capable of easily taking appropriate measures against changes in the key length.

Preferably, the key scheduling part satisfies these characteristics in a well-balanced manner in view of the security and implementation.

(2-2) Regarding Various Types of Intermediate-key Generation Processing Structures The expanded-key generating parts include those using a repetition scheme as employed in AES and those using an intermediate-key generation scheme as employed in Camellia. First, the intermediate-key generation scheme will now be described below.

First, a repletion scheme employed in, for example, AES will be described with reference to FIG. 12. In the repetition scheme, as illustrated in FIG. 12, a key scheduling part (expanded-key generating part) 130 generates an expanded key K' including a plurality of round keys $RK_1$, $RK_2$, $RK_3$, ..., $RK_r$ from a secret key by applying functions called round-key generating parts 131-1 to 130-r on a round-by-round basis or an appropriate number of times.

Using this scheme, an initial expanded key K' can be immediately generated from a secret key K in many cases. Further, the next expanded key K" can be easily calculated from the initial expanded key K'. Therefore, the expanded key can be generated at high speed. Depending on the structure of the round-key generating parts 131-1 to 131-r set in the key scheduling part (expanded-key generating part) 130, however, in the case where round-key generating parts that perform general non-linear processing are used as the round-key generating parts 131-1 to 131-r, the degree of expansion may differ in each expanded key to be used, depending on the number of times the round-key generating part is executed. That is, an expanded key generated by one application of the round-key generating part and an expanded key generated by iterative applications, such as twice or three times, of the round-key generating parts may have different characteristics. Also, generation of a decryption expanded key may require operations different from those in generating an encryption expanded key.

Figure 12:
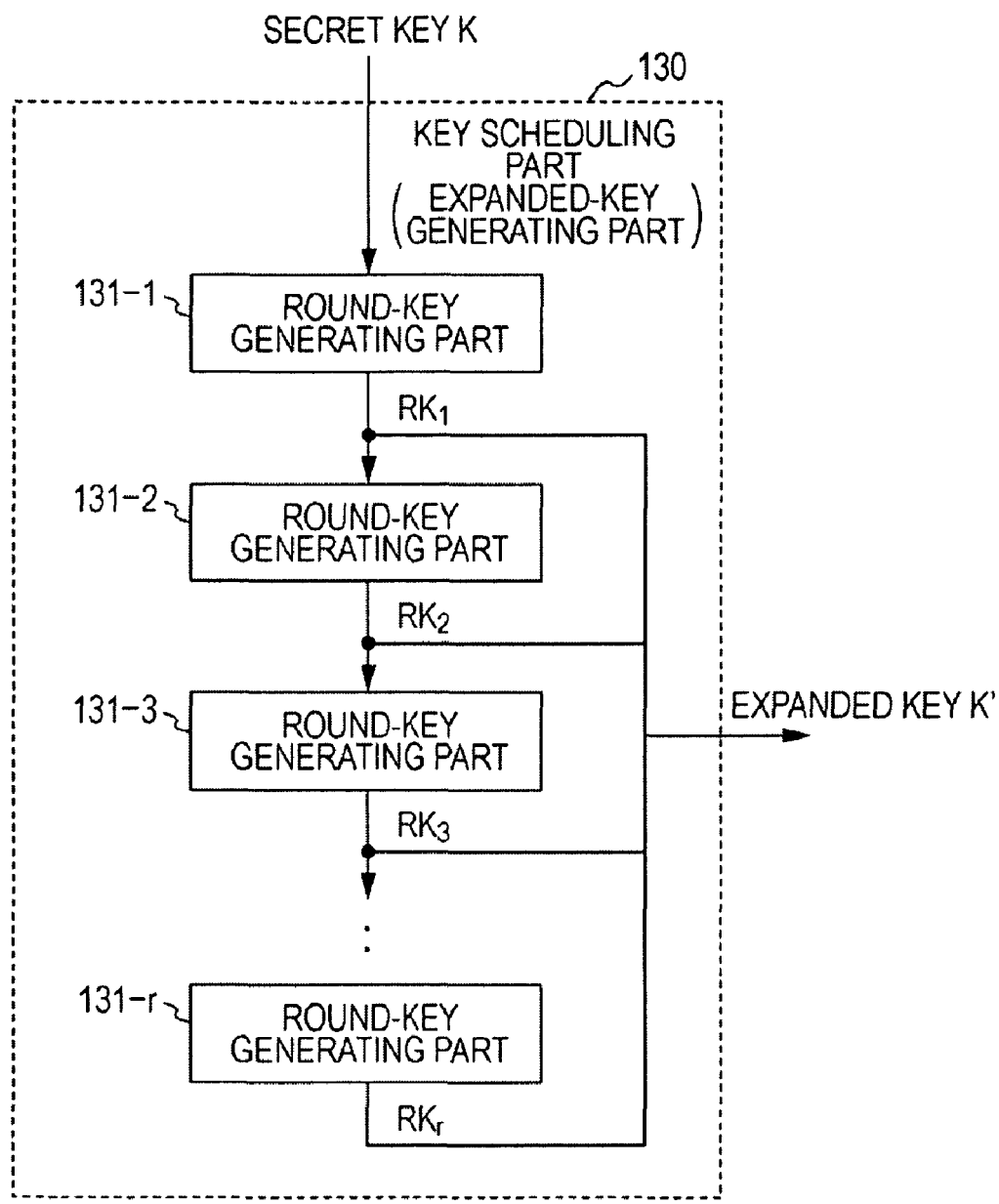
FIG. 12 is a diagram describing a structure example of a key scheduling part that performs round-key generation processing using a repetition scheme as employed in AES.

For example, in a simple iterative scheme involving the round-key generating parts 131-1 to 131-r illustrated in FIG. 12, if a certain difference is given to the secret key K, an arbitrary difference may be given to the round key RK1. If such a difference is given to a round key, a related-key attack may be successful, resulting in lower security. Actually, a key scheduling part of a blockcipher AES is not so well protected against a related-key rectangle attack.

Figure 13:
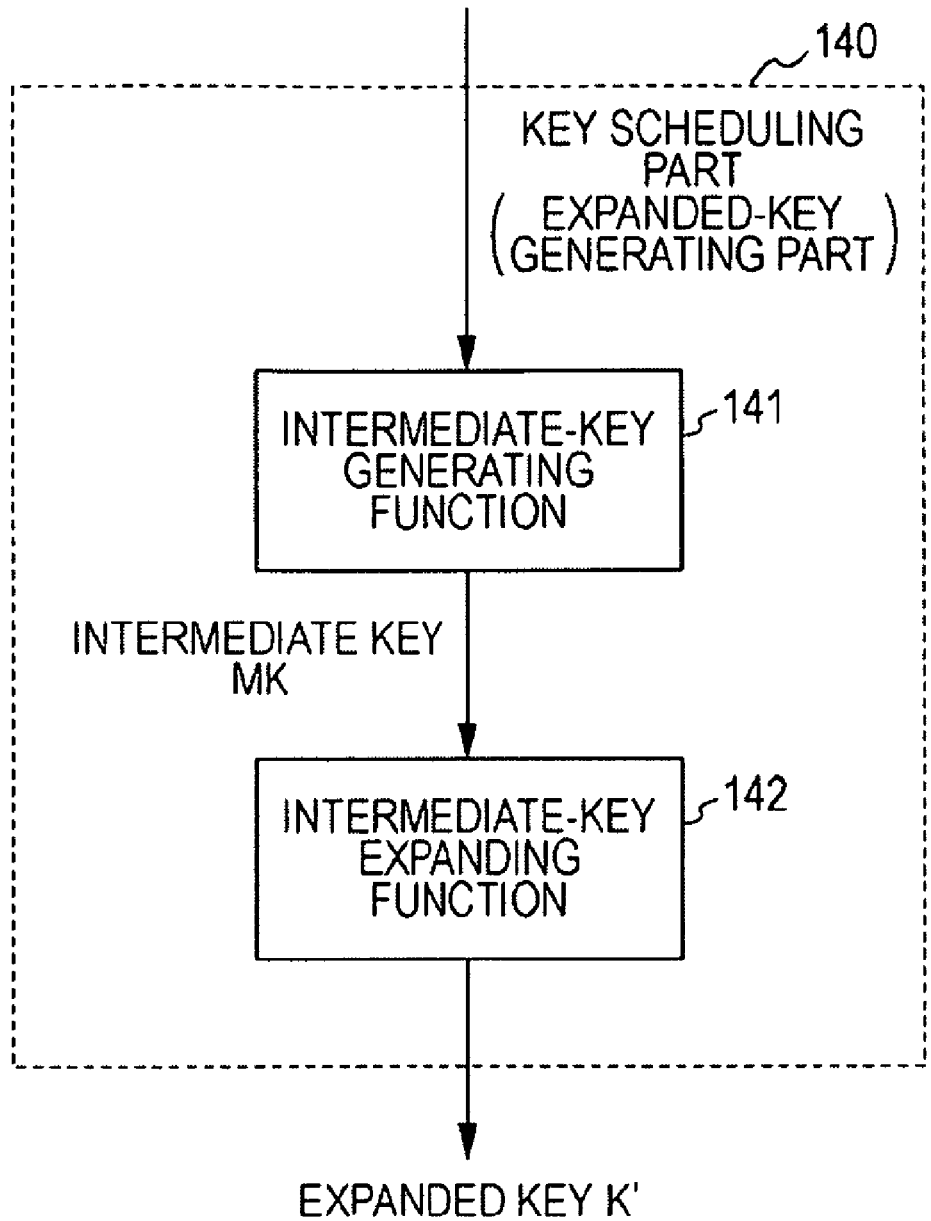
FIG. 13 is a diagram describing a structure example of a key scheduling part that performs round-key generation processing using an intermediate-key generation scheme as employed in Camellia.

Next, an intermediate-key generation scheme as employed in Camellia will be described with reference to FIG. 13. The intermediate-key generation scheme has a structure in which, as illustrated in FIG. 13, an intermediate-key generating function 141 and an intermediate-key expanding function 142 are set in a key scheduling part (expanded-key generating part) 140. A secret key K (k-bit) is input to the intermediate-key generating function 141 to generate an intermediate key MK (m-bit), and further the intermediate key MK and the original secret key K are input to the intermediate-key expanding function 142 to obtain an expanded key K' (k'-bit).

Figure 14:
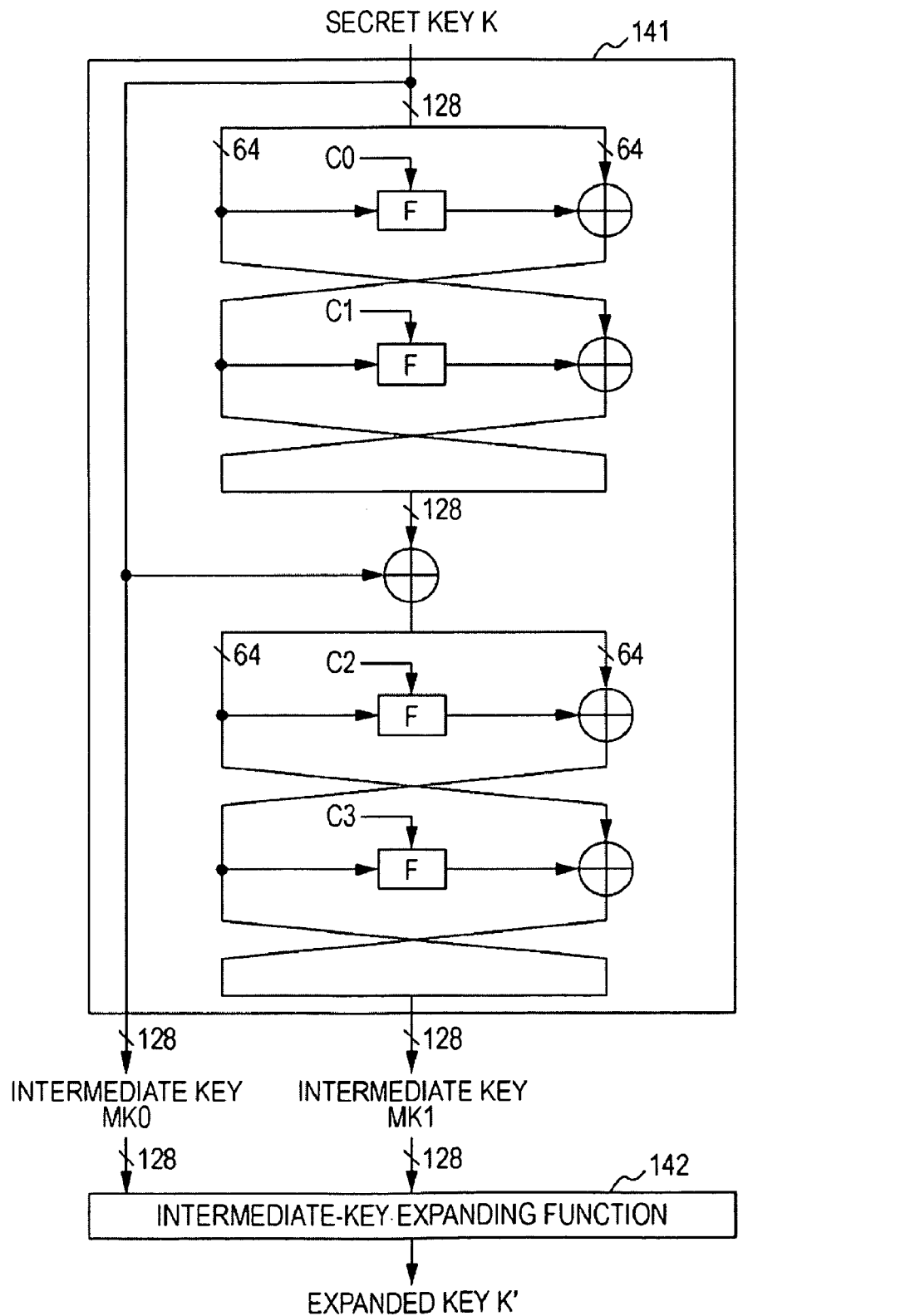
FIG. 14 is a diagram describing a detailed structure example of an intermediate-key generation function 141 illustrated in FIG. 13.

A detailed structure example of the intermediate-key generating function 141 is illustrated in FIG. 14. The example illustrated in FIG. 14 is a detailed structure example of the intermediate-key generating function 141 in the key scheduling part of a common-key cipher Camellia. This structure has an advantage in terms of implementation in which, if an intermediate key is generated by applying the intermediate-key generating function 141 and the generated intermediate key is held in a memory or the like, an expanded key can be easily generated by using the already-generated intermediate key.

However, this intermediate-key generation scheme generally involves a structure of setting a function which satisfies minimal permutation in the intermediate-key generating function. Sufficient permutation is not necessarily achieved, and the immunity against attacks including the above-described related-key attacks is not ensured. In addition, since the intermediate-key expanding function handles a value longer than the original key length K, disadvantageously, a large register for operating values on hardware is necessary.

[3. Intermediate-key and Round-key Generation Processing and Encryption Processing Structure According to Present Invention]

In the present invention, there is proposed an encryption processing apparatus with a key scheduling part which solves the foregoing problems of the key scheduling part, enhances the security by making analysis of keys more difficult, and has a structure that is favorable in terms of implementation.

The structure proposed in the present invention is the structure of a key scheduling part that generates an expanded key, namely, round keys, which is basically the structure of a key scheduling part that takes a k-bit secret key K as an input and generates an expanded key, namely, round keys. Round keys are input to an encryption processing part that performs encryption processing or decryption processing and are applied to respective round functions. Data to be processed as data to be encrypted by the encryption processing part is, for example, as has been described above with reference to FIG. 1 and FIG. 2, subjected to encryption processing in units of blocks having a predetermined bit length of, for example, 64 bits or 128 bits.

In the following description, examples of the structure of a key scheduling part (expanded-key generating part) according to the present invention are classified into two categories and described separately.

(3-1: First Category)

Exemplary structure of key scheduling part that generates intermediate key based on input of secret key whose bit length is same as block length and generates round keys from generated intermediate key (3-2: Second Category)

Exemplary structure of key scheduling part that generates intermediate key based on input of secret key whose bit length can be up to twice block length and generates round keys from generated intermediate key Further, regarding the foregoing first and second categories, embodiments of the present invention will be described in units of structures described below.

(3-1: First Category)

Exemplary structure of key scheduling part that generates intermediate key based on input of secret key whose bit length is same as block length and generates round keys from generated intermediate key (3-1A) Regarding structure example of intermediate-key generating part that achieves enhancement of security against related-key attack by using encryption function E' ensuring immunity against differential attacks in intermediate-key generating part (3-1B) Regarding structure example of intermediate-key expanding part (round-key generating part) that generates round keys based on intermediate key generated by intermediate-key generating part described in above (3-1A), which achieves enhancement of immunity against attacks on encryption (3-1C) Regarding structure example of intermediate-key expanding part (round-key generating part) that generates round keys based on intermediate key generated by intermediate-key generating part described in above (3-1A), which enhances implementation efficiency without sacrificing security (3-2: Second Category)

Exemplary structure of key scheduling part that generates intermediate key based on input of secret key whose bit length can be up to twice block length and generates round keys from generated intermediate key (3-2A) Regarding structure of key scheduling part having advantages of above (3-1A to C)

(3-2B) Regarding structure of key scheduling part having advantages of above (3-1A to C) and capable of performing processing faster than above (3-2A)

The sections will be sequentially described below.

(3-1: First Category)

Exemplary structure of key scheduling part that generates intermediate key based on input of secret key whose bit length is same as block length and generates round keys from generated intermediate key (3-1A) Regarding structure example of intermediate-key generating part that achieves enhancement of security against related-key attack by using encryption function E' ensuring immunity against differential attacks in intermediate-key generating part Firstly, as a structure example that takes a secret key with the same bit length as the block length as an input and generates an expanded key (round keys), a structure example of an intermediate-key generating part that achieves enhancement of the security against a related-key attack by using an encryption function E' ensuring the immunity against differential attacks in the intermediate-key generating part will be described.

This structure example is a key scheduling part (expanded-key generating part) expected to enhance the security against a related-key attack by using an encryption function E' ensuring the immunity against differential attacks in the intermediate-key generating part.

Figure 15:
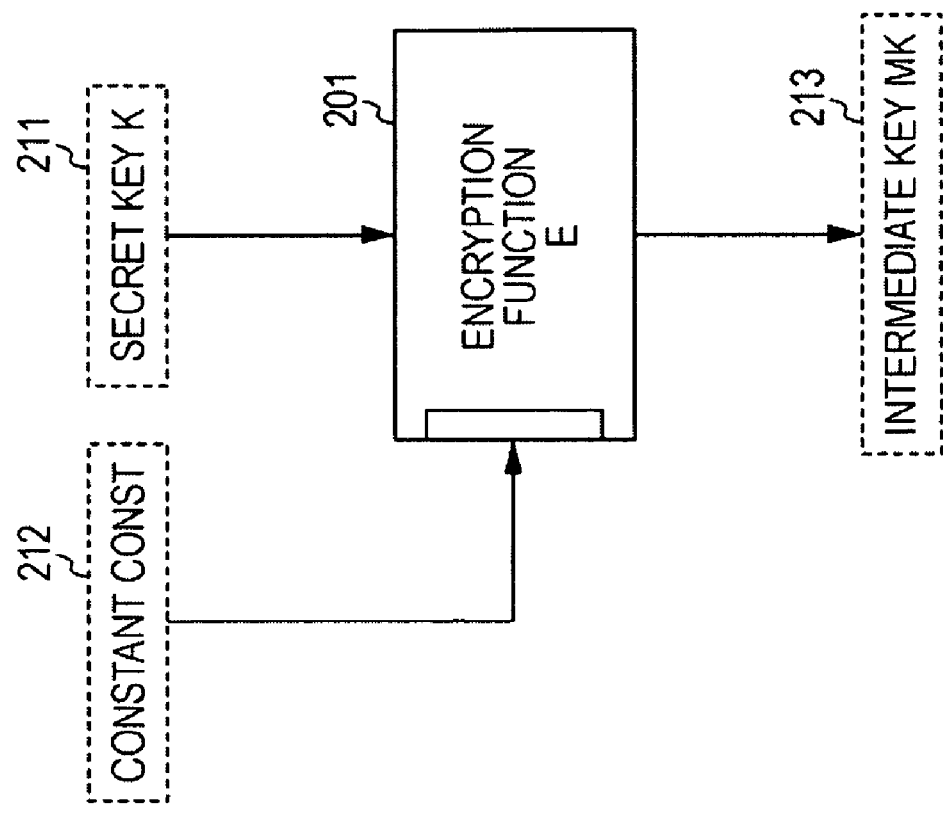
FIG. 15 is a diagram describing a structure example of an intermediate-key generating part of a key scheduling part according to an embodiment of the present invention.

With reference to FIG. 15, a structure example of an intermediate-key generating part of a key scheduling part according to the present embodiment will be described. The intermediate-key generating part of the key scheduling part according to the present embodiment applies an encryption function E201 used in an encryption processing part as it is to generate an expanded key. The encryption function E201 corresponds to the common-key blockcipher processing part E10, which has been described above with reference to FIG. 1. That is, in the present embodiment, instead of providing an independent key scheduling part (expanded-key generating part), the structure employs an encryption processing part that performs the common-key blockcipher processing and inputs a secret key to the encryption processing part, thus obtaining an expanded key as the encryption processing result. The encryption function E201 is an encryption function used to encrypt plaintext in the encryption processing part. The key scheduling part can be configured to generate round keys using the structure of the encryption processing part, resulting in a reduction in the implementation cost.

Note that the detailed structure of the common-key blockcipher processing part E10, which has been described above with reference to FIG. 1, is the structure illustrated in FIG. 2, and the common-key blockcipher processing part E10 performs data transformation by executing round functions at a plurality of stages. In this processing example, a secret key serves as an input to each round function, which is executed to give an expanded key as the processing result.

Note that a round key is necessary at the time of executing each round function. Two inputs, a round key and data to be processed, are necessary. In this processing example, as illustrated in FIG. 15, a secret key [K] 211 and a constant [CONST] 212 are input to the encryption function E201, and intermediate-key generation processing is performed:

$$MK=E(K, CONST)$$

which gives an intermediate key [MK] 213.

Note that, as has been described above, E(A, B) denotes encryption processing using an encryption function E by applying a key B to A.

This scheme is configured to be applicable in the case where the key size of the secret key K coincides with the block size of the encryption function E201. This scheme makes it difficult to input an arbitrary difference to the intermediate key MK by using the encryption function itself as an intermediate-key generating function, thereby ensuring the security against a related-key attack. This is because that there is a demand for the encryption function E201 to have sufficient security against differential attacks, and the encryption function E201 is configured to provide such security in order to meet the demand. Further, it becomes unnecessary to implement an additional intermediate-key generating function in the structure of the present embodiment since the encryption function can be used as it is, as has been described above, and hence the implementation cost can be reduced.

Note that, in the case where sufficient security against differential attacks is ensured in this scheme, instead of using the encryption function E as it is, the structure may use a simplified function E' serving as a transformation processing structure using fewer rounds than those applied to encryption processing. Specifically, it is only necessary that the transition probability between any input difference and output difference of the encryption function E201 does not exceed a threshold. The threshold is a value that is set depending on whether the function thereof can be distinguished from a randomly-defined function having the same input and output sizes as those of the function. In which round the transition probability or its approximate value becomes less than or equal to the threshold is understood at the time an encryption function with the structure of round functions is designed. In the case of AES, for example, it is known that this level can be achieved in the fourth round.

AES, which almost always designs encryption functions with, for example, a few additional rounds for security margin, has ten rounds. It can be said that six rounds serve as a margin for differential attacks. Even in this case, as the encryption function E201, a function without a margin, which can be processed faster, is used.

Figure 16:
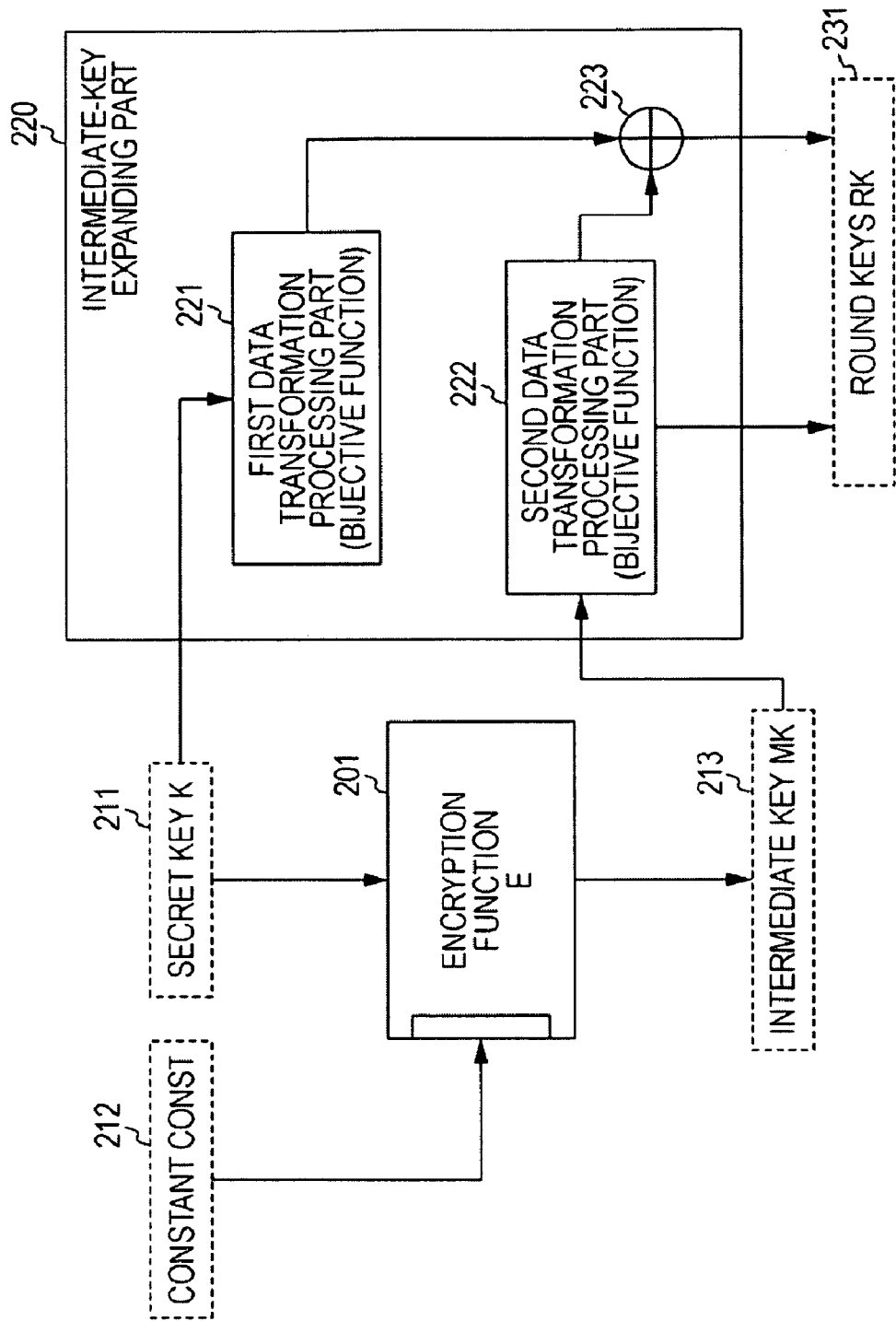
FIG. 16 is a diagram describing the structure of a key scheduling part that generates round keys by applying an intermediate key MK generated by the structure illustrated in FIG. 15 and a secret key K.

(3-1B) Regarding structure example of intermediate-key expanding part (round-key generating part) that generates round keys based on intermediate key generated by intermediate-key generating part described in above (3-1A), which achieves enhancement of immunity against attacks on encryption Next, with reference to FIG. 16 and FIG. 17, a structure example of an intermediate-key expanding part (round-key generating part) that generates round keys on the basis of an intermediate key generated by the intermediate-key generating part described in above (3-1A), which achieves enhancement of immunity against attacks on encryption, will be described.

The structure illustrated in FIG. 16 is the structure of the intermediate-key generating part of the key scheduling part illustrated in FIG. 15, which additionally includes an intermediate-key expanding part 210 including a first data transformation processing part 211, a second data transformation processing part 212, and an exclusive-OR calculating (EXOR) part 213, and outputs round keys RK231. The round keys are applied to respective round functions of the encryption processing part and are n-bit round keys $\{RK_1, RK_2, \ldots RK_r\}$.

A structure example of round keys $\{RK_1, RK_2, \ldots RK_r\}$ generated by processing performed by the key scheduling part illustrated in FIG. 16 is illustrated in FIG. 17. In FIG. 17, thirteen round keys $RK_1$ to $RK_{13}$ from the top are given as examples showing some of the generated round keys. $p_a(MK)$ or $P_{a,b}(MK)$ illustrated in the diagram denotes bijective transformation processing performed by the second data transformation processing part 212 illustrated in FIG. 16, which is the processing result obtained by applying a bijective function to an intermediate key [MK] serving as an input. Also, $P_a(k)$ or $P_{a,b}(K)$ illustrated in the diagram denotes bijective transformation processing performed by the first data transformation processing part 211 illustrated in FIG. 16, which is the processing result obtained by applying a bijective function to a secret key [K] serving as an input. Note that the first data transformation processing part 211 and the second data transformation processing part 212 perform bijection processing in different manners at the time of generating individual round keys.

For example, the first round key $RK_1$ is the result of applying a bijective function $P_1$ to the intermediate key [MK]; and The second round key $RK_2$ is the result of performing an exclusive-OR operation (EXOR) on the result of applying a bijective function $P_{2,1}$ to the intermediate key [MK] and the result of applying a bijective function $P_{2,21}$ to the secret key [K]. The exclusive-OR operation (EXOR) processing is performed by the exclusive-OR calculating (EXOR) part 223 illustrated in FIG. 16.

In this manner, n-bit round keys $\{RK_1, RK_2, \ldots, RK_r\}$ are generated.

The generation processing of round keys $\{RK_1, RK_2, \ldots, RK_r\}$ described with reference to FIG. 16 and FIG. 17 is performed in the following sequence:

(1) The result of applying a predetermined bijective function to MK is stored as $RK_1$;
(2) The result of performing an exclusive-OR operation on the result of applying a predetermined bijective function to MK and the result of applying a predetermined bijective function to K is stored as $RK_2$;
(3) The result of applying a predetermined bijective function to MK is stored as $RK_3$;
(4) The result of performing an exclusive-OR operation on the result of applying a predetermined bijective function to MK and the result of applying a predetermined bijective function to K is stored as $RK_4$; . . .
(repeated as above)

By generating a plurality of round keys $\{RK_1, RK_2, \ldots, RK_r\}$ by performing such processing, keys to be output are ensured to have the following characteristics, which contributes to enhancement of encryption strength, that is, enhancement of security by making analysis of the keys more difficult.

(1) Since an odd-numbered $RK_i$ (i is an odd number) is the result of bijection of MK, it is ensured that, when K changes to a different value, so does $RK_i$ at all times. Therefore, it is ensured that no equivalent keys defined in the foregoing description exist.

(2) Since an even-numbered $RK_i$ (i is an even number) is the result of performing an exclusive-OR operation on values obtained by bisection of MK and K, respectively, it is impossible to reconstruct the values of MK and K from the result thereof. Therefore, even if only an even-numbered key $RK_i$ is disclosed first by an attack, the value of the original secret key K will not be disclosed.

(3) Since it is ensured that two consecutive $RK_i$ and $RK_{i+1}$ always store components corresponding to two patterns:
MK; and
a combination of MK and K,
$2^m$ brute force attacks must always be performed in order to estimate an m-bit value less than or equal to arbitrary n bits from 2n bits combining $RK_i$ and $RK_{i+1}$, resulting in an increase in the analysis cost.

For example, in a conventional structure of generating round keys by repeatedly using only MK, such as in a key generating structure where $RK_i$=MK and $RK_{i+1}$=MK, estimation of m bits involves a lower calculation cost if selected bits are the same as previously selected bits. In contrast, in this processing example, $2^m$ brute force attacks must always be performed, resulting in an increase in the analysis cost. Therefore, it becomes more difficult for attackers to analyze the keys. This can be ensured even when bijective functions are cryptographically weak.

As above, by generating round keys using the structure of the key scheduling part described with reference to FIG. 16 and FIG. 17, it becomes more difficult to analyze the keys, thereby realizing a highly secure encryption processing structure.

(3-1C) Regarding structure example of intermediate-key expanding part (round-key generating part) that generates round keys based on intermediate key generated by intermediate-key generating part described in above (3-1A), which enhances implementation efficiency without sacrificing security Next, a structure example of an intermediate-key generating part (round-key generating part) that generates round keys on the basis of an intermediate key generated by the intermediate-key generating part described in above (3-1A), which is the intermediate-key generating part (round-key generating part) which enhances implementation efficiency without sacrificing security, will be described.

In the structure of generating round keys from the secret key [K] and the intermediate key [MK] by applying bijective functions and exclusive-OR operations described above with reference to FIG. 16 and FIG. 17, it has been described that all the bijective functions used are different from one another. However, when implementation is taken into consideration, it is preferable that the same function be applied as these bijective functions.

Figure 18:
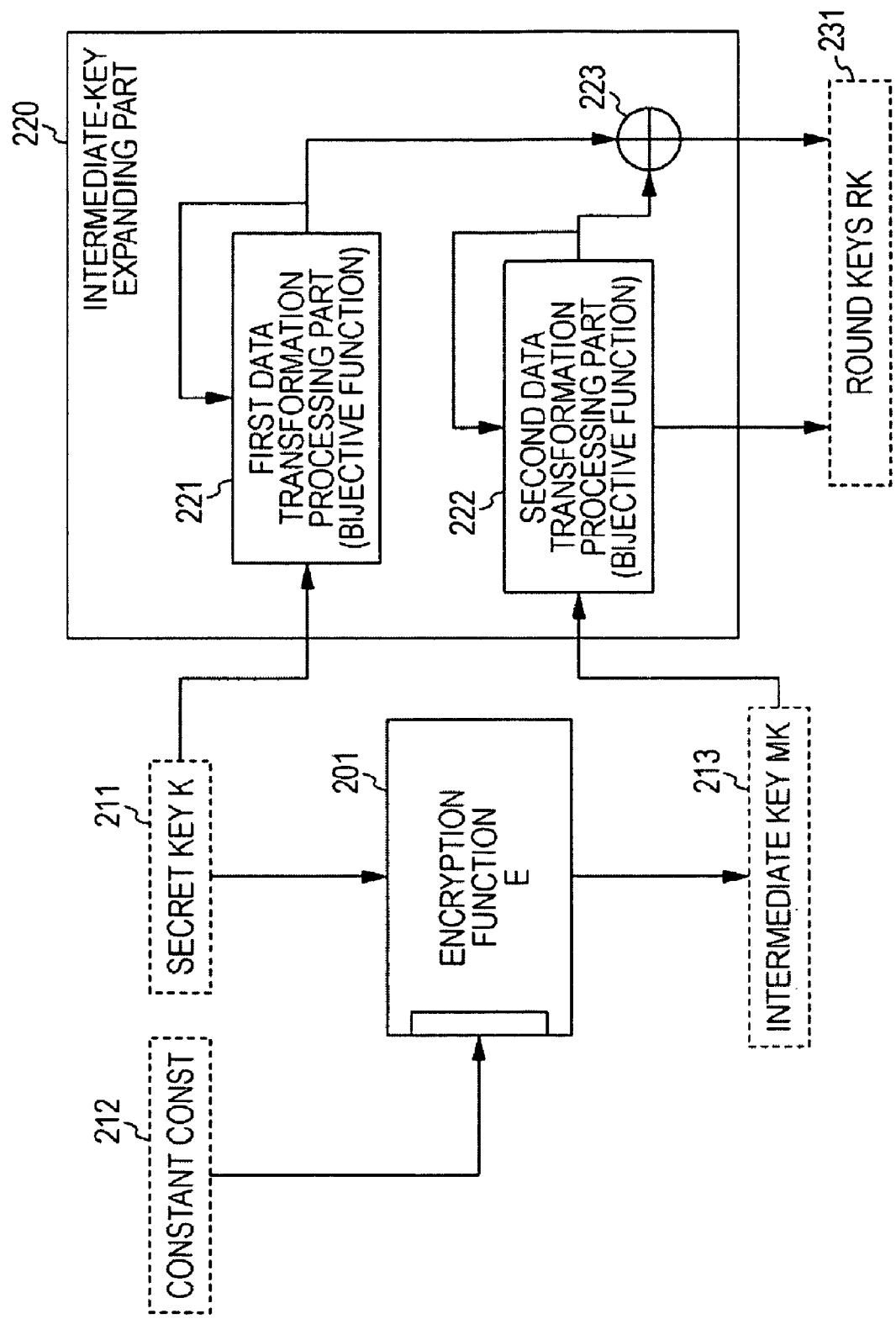
FIG. 18 is a diagram describing a structure example of the key scheduling part illustrated in FIG. 16 in which a common bijective function is used.

For example, the bijective function $P_1$ applied to the intermediate key [MK] in generation processing of the first generated key [$RK_1$] and the bijective function $P_{2,1}$ applied to the intermediate key [MK] in generation processing of the second generated key [$RK_2$] are made equal. For example, as illustrated in FIG. 18, the second data transformation processing part 222 generates a plurality of pieces of data for round-key generation by performing the following processing:

(1) Let MK' be the result of applying a bijective function, for the first time, to MK, which serves as $RK_1$; and
(2) Let MK" be the result of applying the same bijective function, for the second time, to MK', which serves as data for generating $RK_2$.

Hereinafter, a similar procedure is repeated to generate data for generating $RK_3$, $RK_4$, . . .

Hardware implementation with such a structure can reduce a register area for storing the value of the intermediate key [MK] and its updated values and the number of bijective functions to be implemented, resulting in a reduction in the implementation cost.

A similar structure is applied to data transformation of the secret key [K], which is necessary at the time of determining an even-numbered $RK_i$ (i is an even number). That is, the first data transformation processing part 231 illustrated in FIG. 18 performs the following processing:

(1) Let K' be the result of applying a bijective function, for the first time, to the secret key [K], which serves as data for generating $RK_2$; and
(2) Let K" be the result of applying the same bijective function, for the second time, to K', which serves as data for generating $RK_4$.

Hereinafter, a similar procedure is repeated to generate data for generating $RK_6$, $RK_8$, . . .

Regarding the processing corresponding to the secret key [K], the efficiency can be further enhanced in the following manner. To determine an even-numbered $RK_i$ (i is an even number), a predetermined bijective function is applied to the secret key [K]. The bijective function used here is a function that outputs K without changing it.

Figure 19:
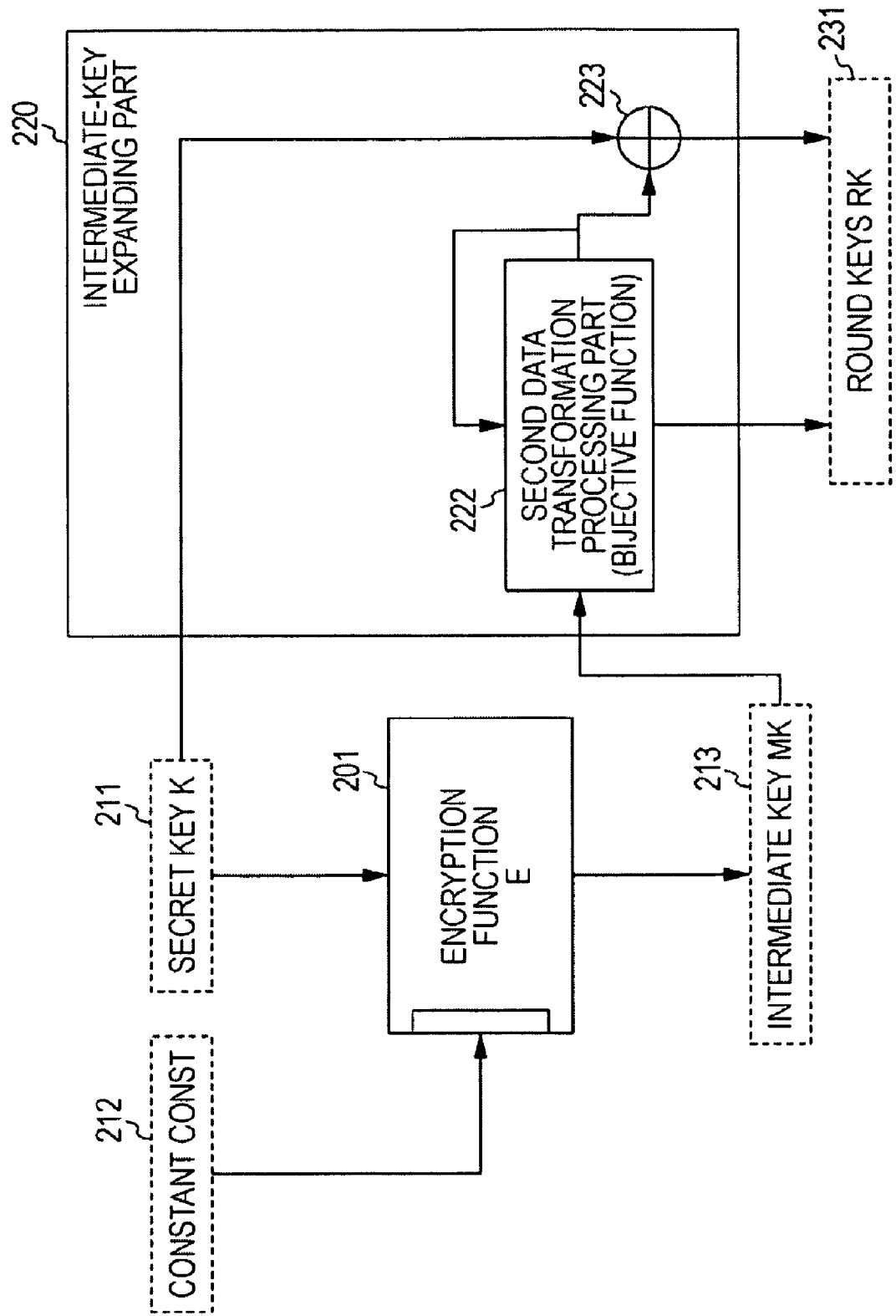
FIG. 19 is a diagram describing a structure example of the key scheduling part illustrated in FIG. 17 in which a first data transformation processing part is omitted.

That is, in the case of generating an even-numbered $RK_i$ (i is an even number), the structure performs an exclusive-OR operation on the secret key [K] as it is. This processing structure is, as illustrated in the structure of FIG. 19, the structure illustrated in FIG. 18 in which the first data transformation processing part 221 is omitted.

Even with such a structure, the encryption strength will not be reduced. Accordingly, there is an advantage that bijective functions for application to the secret key [K] can be omitted. Further, the register for storing K becomes unnecessary, resulting in a reduction in the hardware resources. This is because the value of the secret key [K] has already been supplied as an input signal to a hardware processor, and this value is continuously held during the encryption processing and can be referred to at any timing.

(3-2: Second Category)

Exemplary structure of key scheduling part that generates intermediate key based on input of secret key whose bit length can be up to twice block length and generates round keys from generated intermediate key Next, a structure example of a key scheduling part that takes a secret key whose bit length can be up to twice the block length as an input and generates an expanded key (round keys) will be described.

(3-2A) Regarding structure of key scheduling part having advantages of above (3-1A to C)

First, as a structure example of a key scheduling part (expanded-key generating part) that takes a secret key whose bit length can be up to twice the block length as an input and generates an expanded key (round keys), the structure of a key scheduling part with advantages of (3-1A) to (3-1C) described above will be described.

In above (3-1A to C), the processing structure in the case where the secret key [K] whose length is the same as the block length [n] serving as unit data to be processed by the encryption function of the encryption processing part has been described. However, in order to widen the range of encryption application, it is preferable that, not only the case where the secret key [K] whose length is the same as the block length [n] is input can be handled, but also a secret key having 2n bits at maximum can be handled. A structure example of such a key scheduling part will be described below.

Let the block length serving as unit data to be processed by the encryption function of the encryption processing part be n bits, and the bit size of a secret key [K] input to the key scheduling part be m bits ($n+1 \leq m \leq 2n$).

Figure 20:
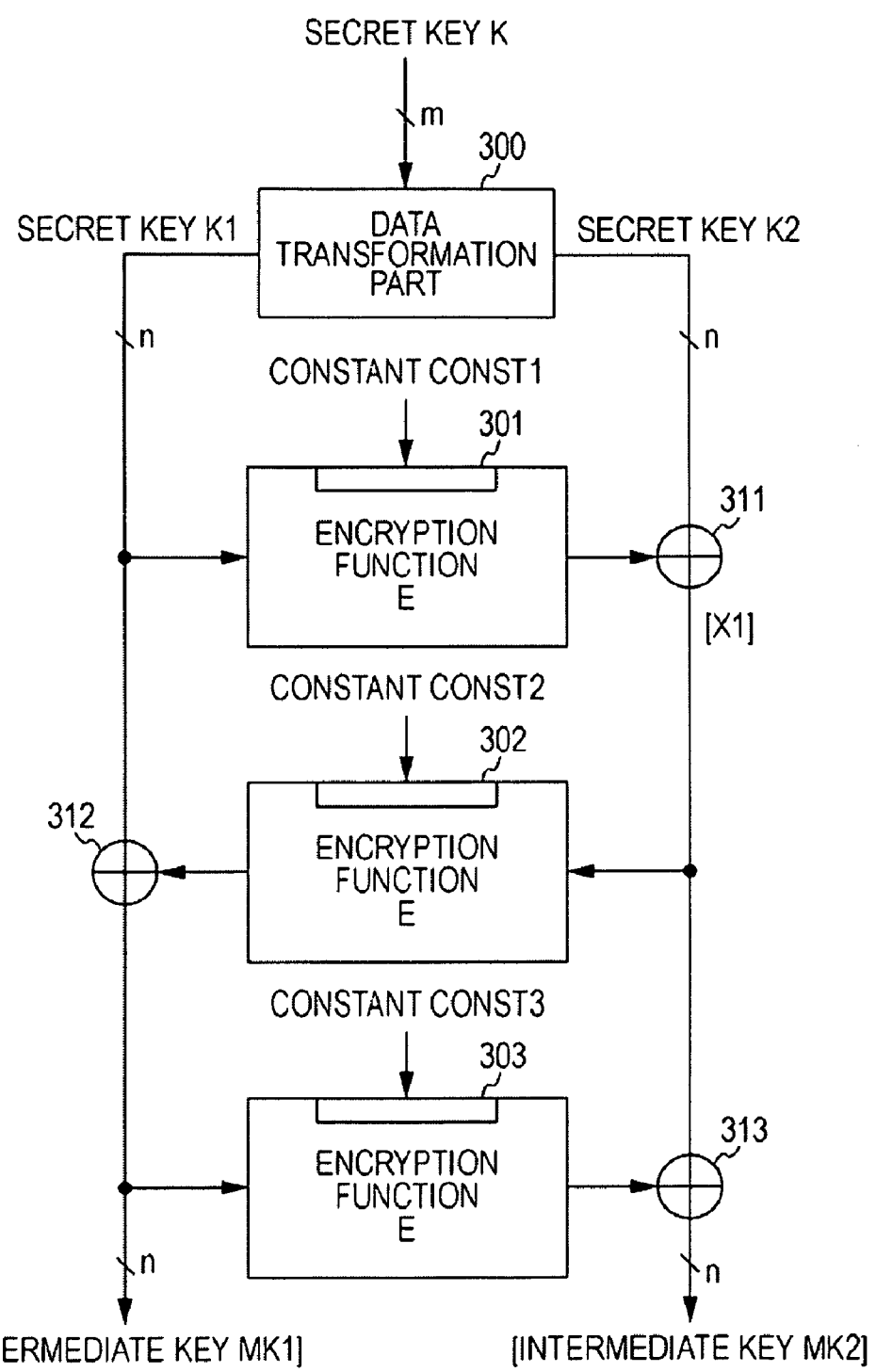
FIG. 20 is a diagram describing a structure example of an intermediate-key generating part of a key scheduling part capable of handling a secret key whose length is 2n bits at maximum, which is longer than the block length [n].

FIG. 20 illustrates the structure of an intermediate-key generating part of a key scheduling part. As illustrated in FIG. 20, the intermediate-key generating part of the key scheduling in this processing example has a Feistel structure. In the structure, encryption functions E301 to E303 are set in F-function parts which are round functions in the Feistel structure. Further, the structure includes a data transformation part 300 and exclusive-OR calculating (EXOR) parts 311 to 313. These structures are configured to be used to encrypt plaintext in an encryption processing part. That is, even in this processing example, the key scheduling part is configured to be capable of generating round keys using the structure of the encryption processing part, thereby reducing the implementation cost.

First, data transformation of an m-bit secret key [K] input to the key scheduling part is performed by the data transformation part 300 to generate two pieces of n-bit secret-key-transformed data [K1] and [K2]. As a specific method, the first n bits of an (m+n)-bit value (K|000000000) generated by consecutively appending n 0's to the input secret key [K] serve as the first secret-key-transformed data [K1], and the next n bits serve as the second secret-key-transformed data [K2].

Alternatively, the data transformation part 300 may be configured to generate data [K|K] by arranging two secret keys [K], and the former n bits serve as the first secret-key-transformed data [K1]=K, and the latter n bits serve as the second secret-key-transformed data [K2]=K.

Alternatively, the data transformation part 300 may be configured to generate a structure K|K (inverted) by connecting bit-inverted K to the secret key [K] and divide the structure into n-bit pieces, starting with the first bit. The former n bits serve as the first secret-key-transformed data [K1]=K, and the latter n bits serve as the second secret-key-transformed data [K2]=inverted data of K.

Next, data transformation of these first secret-key-transformed data [K1] and second secret-key-transformed data [K2] is performed in accordance with the 3-round Feistel structure in which the encryption functions E301 to E303 are regarded as F-functions which are round functions in the Feistel structure, and, as a result, n-bit intermediate keys [MK1] and [MK2] are obtained.

Predetermined constants [CONST1], [CONST2], and [CONST3] are input to the encryption functions E301 to E303, respectively, and data transformation is performed. An intermediate value [X1] and the intermediate keys [MK1] and [MK2] to be output, which are illustrated in FIG. 20, are generated by the following processing:

$$X1 = K2 (EXOR)(E(K1, CONST1))$$

$$MK1 = K1 (EXOR)(E(X1, CONST2))$$

$$MK2 = X1 (EXOR)(E(MK1, CONST3))$$

Note that A(EXOR)B denotes an exclusive-OR operation on A and B, and

E(A, B) denotes encryption processing using an encryption function E by applying a key B to A.

The relational expressions among the intermediate keys [MK1] and [MK2], the first secret-key-transformed data [K1], and the second secret-key-transformed data [K2] are as follows:

$$MK1 = E[(E(K1, CONST1))(EXOR)K2, CONST2] \\ (EXOR)K1$$

$$MK2 = E(E(MK1, CONST3))(EXOR)(E(K1, \\ CONST1))(EXOR)K2$$

In the encryption processing structure applying a Feistel structure such as that illustrated in FIG. 20, it is known that, for example, by setting the encryption functions E301 to E303 as functions that are robust against differential attacks, the result of performing the 3-round Feistel is similarly robust as 2n-bit data transformation functions. Therefore, the intermediate-key generation processing structure using the data transforming structure illustrated in FIG. 20 becomes a key generating structure with high encryption strength. It thus becomes difficult to obtain the secret key information by analyzing the generated intermediate keys [MK1] and [MK2], thereby implementing highly secure intermediate-key generation.

Note that, in the case where sufficient security against differential attacks is ensured in this scheme, instead of using the encryption function E as it is, the structure may use a simplified function E' as a transformation processing structure using fewer rounds than those applied to encryption processing. Specifically, it is only necessary that the transition probability between any input difference and output difference of the encryption function E201 does not exceed a threshold. The threshold is a value that is set depending on whether the function thereof can be distinguished from a randomly-defined function having the same input and output sizes as those of the function. In which round the transition probability or its approximate value becomes less than or equal to the threshold is understood at the time an encryption function with the structure of round functions is designed. In the case of AES, for example, it is known that this level can be achieved in the fourth round.

Figure 21:
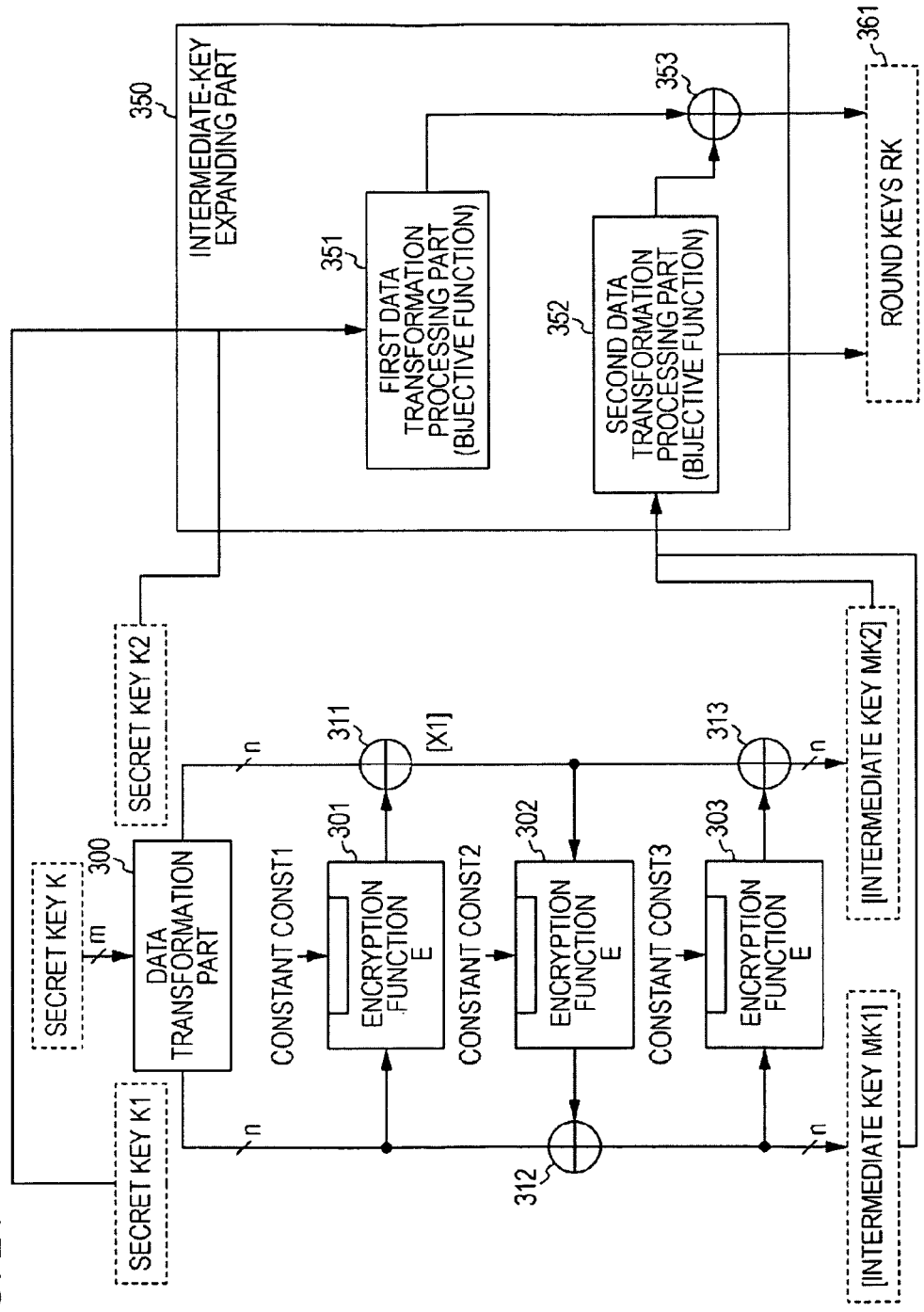
FIG. 21 is a diagram describing the structure of a key scheduling part that generates round keys by applying an intermediate key MK generated by the structure illustrated in FIG. 20 and a secret key K.

Further, with reference to FIG. 21 and FIG. 22, a round-key generation processing structure applying the intermediate-key generating structure illustrated in FIG. 20 will be described. The structure illustrated in FIG. 21 is the structure of the intermediate-key generating part structure of the key scheduling part illustrated in FIG. 20, which additionally includes an intermediate-key expanding part 350 including a first data transformation processing part 351, a second data transformation processing part 352, and an exclusive-OR calculating (EXOR) part 353, that is, the intermediate-key expanding part 350 functioning as a round-key generating part, and outputs round keys RK361. The round keys are applied to respective round functions of the encryption processing part and are n-bit round keys $\{RK_1, RK_2, \ldots RK_r\}$.

A structure example of round keys $\{RK_1, RK_2, \ldots RK_r\}$ generated by the processing performed by the key scheduling part illustrated in FIG. 21 is illustrated in FIG. 22. In FIG. 22, thirteen round keys $RK_1$ to $RK_{13}$ from the top are given as examples showing some of the generated round keys. $p_a(MK1)$, $P_{a,b}(MK1)$, $p_a(MK2)$, and $P_{a,b}(MK1)$ illustrated in the diagram denote bijective transformation processing performed by the second data transformation processing part 352 illustrated in FIG. 21, each of which is the processing result obtained by applying a bijective function to the intermediate key [MK1] or [MK2] serving as an input. Also, $p_a(k1)$, $P_{a,b}(K1)$, $p_a(k2)$, and $P_{a,b}(K^2)$ illustrated in the diagram denote bijective transformation processing performed by the first data transformation processing part 351 illustrated in FIG. 21, each of which is the processing result obtained by applying a bijective function to the secret-key-transformed data [K1] or [K2] serving as an input. Note that the first data transformation processing part 351 and the second data transformation processing part 352 perform bijection processing in different manners at the time of generating individual round keys.

For example, the first round key $RK_1$ is the result of applying a bijective function $P_1$ to the intermediate key [MK1]; and the second round key $RK_2$ is the result of performing an exclusive-OR operation (EXOR) on the result of applying a bijective function $P_{2,1}$ to the intermediate key [MK1] and the result of applying a bijective function $P_{2,2}$ to the second secret-key-transformed data [K2].

The third round key $RK_3$ is the result of applying a bijective function $P_3$ to the intermediate key [MK2]; and The fourth round key $RK_4$ is the result of performing an exclusive-OR operation (EXOR) on the result of applying a bijective function $P_{4,1}$ to the intermediate key [MK2] and the result of applying a bijective function $P_{4,2}$ to the first secret-key-transformed data [K1].

In this manner, n-bit round keys $\{RK_1, RK_2, \ldots, RK_r\}$ are generated.

The generation processing of round keys $\{RK_1, RK_2, \ldots, RK_r\}$ described with reference to FIG. 21 and FIG. 22 is performed in the following sequence:
(1) The result of applying a predetermined bijective function to MK1 is stored as $RK_1$;
(2) The result of performing an exclusive-OR operation on the result of applying a predetermined bijective function to MK1 and the result of applying a predetermined bijective function to K2 is stored as $RK_2$;
(3) The result of applying a predetermined bijective function to MK2 is stored as $RK_3$;
(4) The result of performing an exclusive-OR operation on the result of applying a predetermined bijective function to MK2 and the result of applying a predetermined bijective function to K1 is stored as $RK_4$;
(5) The result of applying a predetermined bijective function to MK1 is stored as $RK_5$;
(6) The result of performing an exclusive-OR operation on the result of applying a predetermined bijective function to MK1 and the result of applying a predetermined bijective function to K2 is stored as $RK_6$;
(7) The result of applying a predetermined bijective function to MK2 is stored as $RK_7$;
(8) The result of performing an exclusive-OR operation on the result of applying a predetermined bijective function to MK2 and the result of applying a predetermined bijective function to K1 is stored as $RK_8$; . . .
(repeated as above)

Note that, in the above sequence, the structure may exchange the intermediate keys [MK1] and [MK2] for each other or exchange the secret-key-transformed data [K1] and [K2] for each other.

By generating a plurality of round keys $\{RK_1, RK_2, \ldots, RK_r\}$ by performing such processing, keys to be output are ensured to have the following characteristics, which contributes to enhancement of encryption strength, that is, enhancement of security by making analysis of the keys more difficult.

(1) The combining of an odd-numbered $RK_i$ (i is an odd number) and $RK_{i+2}$ gives MK1 and MK2, which is the result of bisection of K1|K2. It is thus ensured that, when K changes to a different value, so does $RK_i|RK_{i+2}$ at all times. Therefore, it is ensured that no equivalent keys defined in the foregoing description exist.
(2) The combining of an even-numbered $RK_i$ (i is an even number) and $RK_{i+2}$ gives the result of performing an exclusive-OR operation on values obtained by bisection of 2n-bit data generated from MK1 and MK2 and of 2n-bit data generated from K1 and K2, respectively, and it is thus difficult to reconstruct the values of MK1, MK2, K1, and K2 from the result thereof. Therefore, even if only an even-numbered even-numbered $RK_i$ (i is an even number) and $RK_{i+2}$ are disclosed first by an attack, the value of the original secret key K will not be disclosed.
(3) Since it is ensured that four consecutive $RK_i$, $RK_{i+1}$, $RK_{i+2}$, and $RK_{i+3}$ always store components corresponding to four patterns:
MK1;
MK2;
a combination of MK1 and K2; and
a combination of MK2 and K1,
$2^m$ brute force attacks must always be performed in order to estimate an m-bit value less than or equal to arbitrary 2n bits from 4n bits combining $RK_i$, $RK_{i+1}$, $RK_{i+2}$, and $RK_{i+3}$, resulting in an increase in the analysis cost. Therefore, it becomes more difficult for attackers to analyze the keys. This can be ensured even when bijective functions are cryptographically weak. Note that this effect exists even when MK1 and MK2 are exchanged for each other or K1 and K2 are exchanged for each other.

As above, by generating round keys using the structure of the key scheduling part described with reference to FIG. 21 and FIG. 22, it becomes more difficult to analyze the keys, thereby realizing a highly secure encryption processing structure.

Note that, in the present embodiment, as in the above-described embodiment, instead of having all different bijective functions to be used, when at least some of the bijective functions are common bijective functions, the implementation efficiency can be increased.

Figure 23:
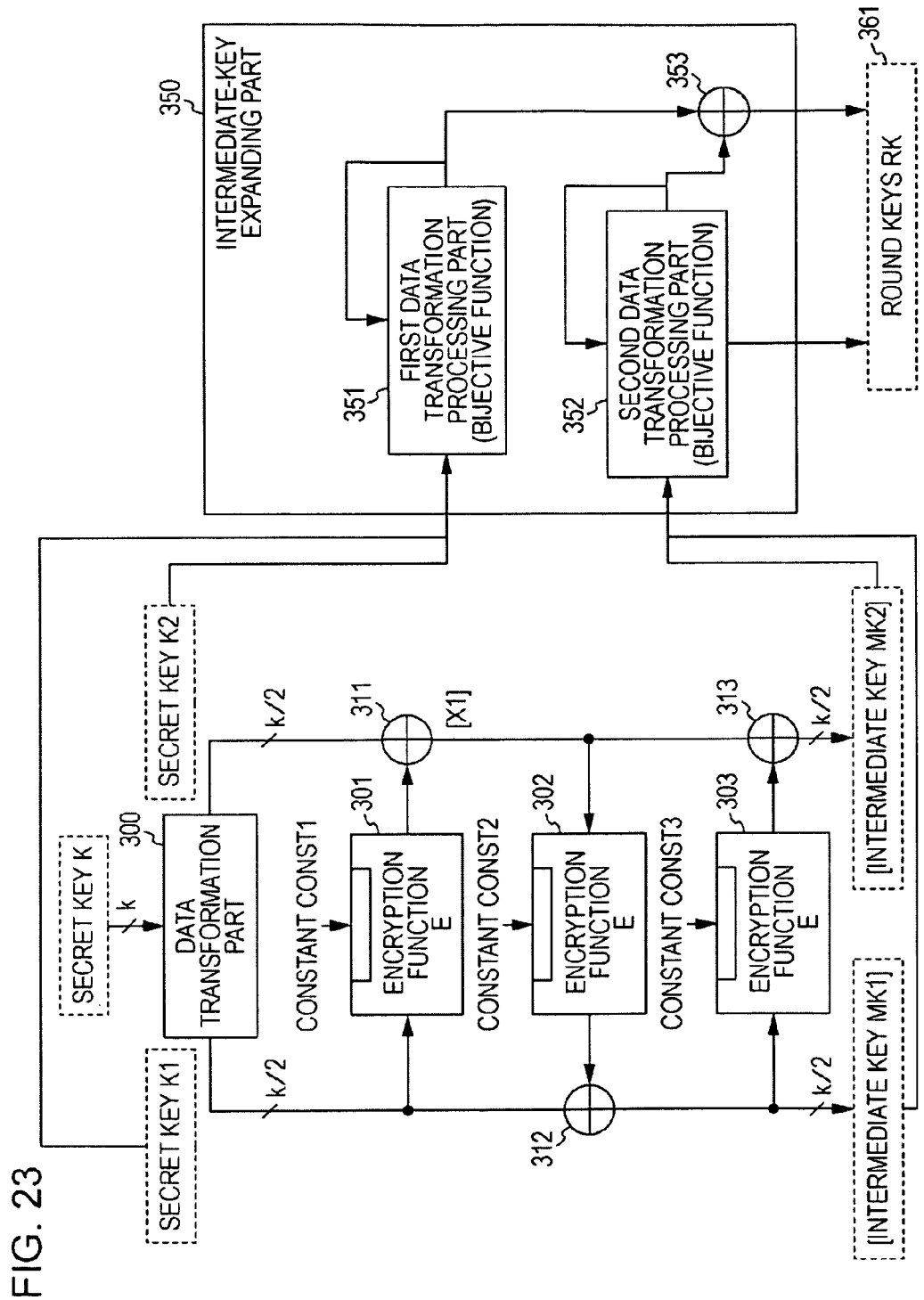
FIG. 23 is a diagram describing a structure example of the key scheduling part illustrated in FIG. 21 in which a common bijective function is used.

For example, in a setting example in which the bijective functions applied to the intermediate key [MK1] are made common, the following processing is performed. The bijective function $P_1$ applied to the intermediate key [MK1] in generation processing of the first generated key [$RK_1$] and the bijective function $P_{2,1}$ applied to the intermediate key [MK1] in generation processing of the second generated key [$RK_2$] are made equal. As illustrated in FIG. 23, the second data transformation processing part 352 generates a plurality of pieces of data for round-key generation by performing the following processing:
(1) Let MK1' be the result of applying a bijective function, for the first time, to MK1, which serves as $RK_1$; and
(2) Let MK1" be the result of applying the same bijective function, for the second time, to MK1', which serves as data for generating $RK_2$.

Hereinafter, a similar procedure is repeated to generate data for generating $RK_3$, $RK_4$, . . .

In the above-described processing, the structure example employs common bijective transformation to be applied to the intermediate key [MK1] common. Similarly, a structure that employs common bijective transformation to be applied to the intermediate key [MK2] is also feasible. Further, a structure may employ common bijective transformation to be applied to the two intermediate keys [MK1] and [MK2].

Similarly, a structure that employs a common bijective function to be applied to the first secret-key-transformed data [K1], a structure that employs a common bijective function to be applied to the second secret-key-transformed data [K2] common, and further, a structure that employs a common bijective function to be applied to the first secret-key-transformed data [K1] and the second secret-key-transformed data [K2] are feasible. In these cases, as illustrated in FIG. 23, the first data transformation processing part 351 performs data transformation processing in which a common bijective function is applied to at least some of the transformation processes.

Hardware implementation with this structure can reduce a register area for storing the values of the intermediate keys [MK1] and [MK2] and the secret-key-transformed data [K1] and [K2] and their updated values and the number of bijective functions to be implemented, resulting in a reduction in the implementation cost.

(3-2B) Regarding structure of key scheduling part having advantages of above (3-1A to C) and capable of performing processing faster than above (3-2A)

Next, the structure of a key scheduling part which has the advantages of the offensives described above in the sections (3-1A to C) and which can perform the processing faster than the structure described in above (3-2A) will be described.

The present embodiment is also an embodiment regarding a structure example of a key scheduling part (expanded-key generating part) which can handle not only the case where a secret key K whose length is the same as the block length, which is a unit for processing of an encryption function set in an encryption processing part, is input, but also a secret key having 2n bits at maximum.

Figure 24:
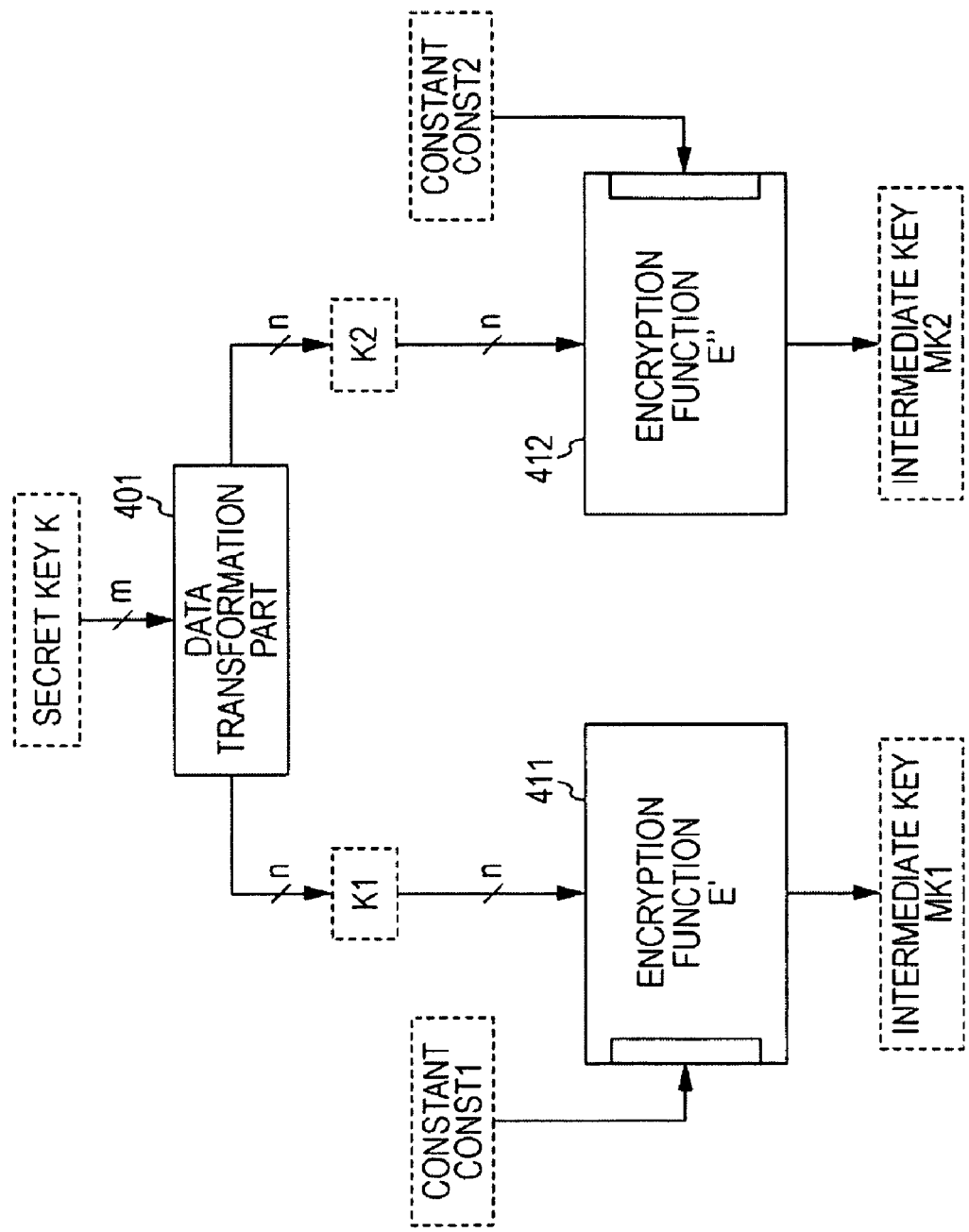
FIG. 24 is a diagram describing a structure example of an intermediate-key generating part of a key scheduling part capable of handling a secret key whose length is 2n bits at maximum, which is longer than the block length [n].

Note that the block length which is a unit for processing by the encryption function is n bits, and the size of a secret key input to the key scheduling part is m bits (n+1≦m≦2n). With reference to FIG. 24, the structure of an intermediate-key generating part of a key scheduling part according to the present embodiment will be described.

First, data transformation of an m-bit secret key [K] input to the key scheduling part is performed by a data transformation part 401 to generate two pieces of n-bit secret-key-transformed data [K1] and [K2]. As a specific method, the first n bits of an (m+n)-bit value (K|000000000) generated by consecutively appending n 0's to the input secret key [K] serve as the first secret-key-transformed data [K1], and the next n bits serve as the second secret-key-transformed data [K2].

Alternatively, the data transformation part 300 may be configured to generate data [K|K] by arranging two secret keys [K], and the former n bits serve as the first secret-key-transformed data [K1]=K, and the latter n bits serve as the second secret-key-transformed data [K2]=K.

Alternatively, the data transformation part 300 may be configured to generate a structure K|K (inverted) by connecting bit-inverted K to the secret key [K] and divide the structure into n-bit pieces, starting with the first bit. The former n bits serve as the first secret-key-transformed data [K1]=K, and the latter n bits serve as the second secret-key-transformed data [K2]=inverted data of K.

Next, as illustrated in FIG. 24, the first secret-key-transformed data [K1] is input to an encryption function E411, the second secret-key-transformed data [K2] is input to an encryption function E412, and encryption processing is performed by the encryption functions. These encryption functions are encryption functions used to encrypt plaintext in the encryption processing part. That is, even in this processing example, the key scheduling part is configured to be capable of generating round keys using the structure of the encryption processing part, resulting in a reduction in the implementation cost.

Specific processing using these encryption functions will be described. Predetermined constants [CONST1] and [CONST2] are input to the encryption functions E411 and E412, respectively, and the following data transformation processing is performed to generate intermediate keys [MK1] and [MK2]:

$$MK1 = E(K1, CONST1)$$

$$MK2 = E(K2, CONST2)$$

The above equations denote that the intermediate key [MK1] is generated by performing encryption processing in the encryption function E111 by applying the constant [CONST1] to the first secret-key-transformed data (K1), and the intermediate key [MK2] is generated by performing encryption processing in the encryption function E12 by applying the constant [CONST2] to the second secret-key-transformed data [K2]. With the processing, the two n-bit intermediate keys [MK1] and [MK2] are generated, and round keys are generated on the basis of these intermediate keys. In this processing example, processing of the encryption function E11 can be performed in parallel to processing of the encryption function E12, whereby the processing time can be reduced.

Note that, in the case where sufficient security against differential attacks is ensured in this scheme, instead of using the encryption function E as it is, the structure may use a simplified function E' as a transformation processing structure using fewer rounds than those applied to encryption processing. Specifically, it is only necessary that the transition probability between any input difference and output difference of the encryption function E201 does not exceed a threshold. The threshold is a value that is set depending on whether the function thereof can be distinguished from a randomly-defined function having the same input and output sizes as those of the function. In which round the transition probability or its approximate value becomes less than or equal to the threshold is understood at the time an encryption function with the structure of round functions is designed. In the case of AES, for example, it is known that this level can be achieved in the fourth round.

Figure 25:
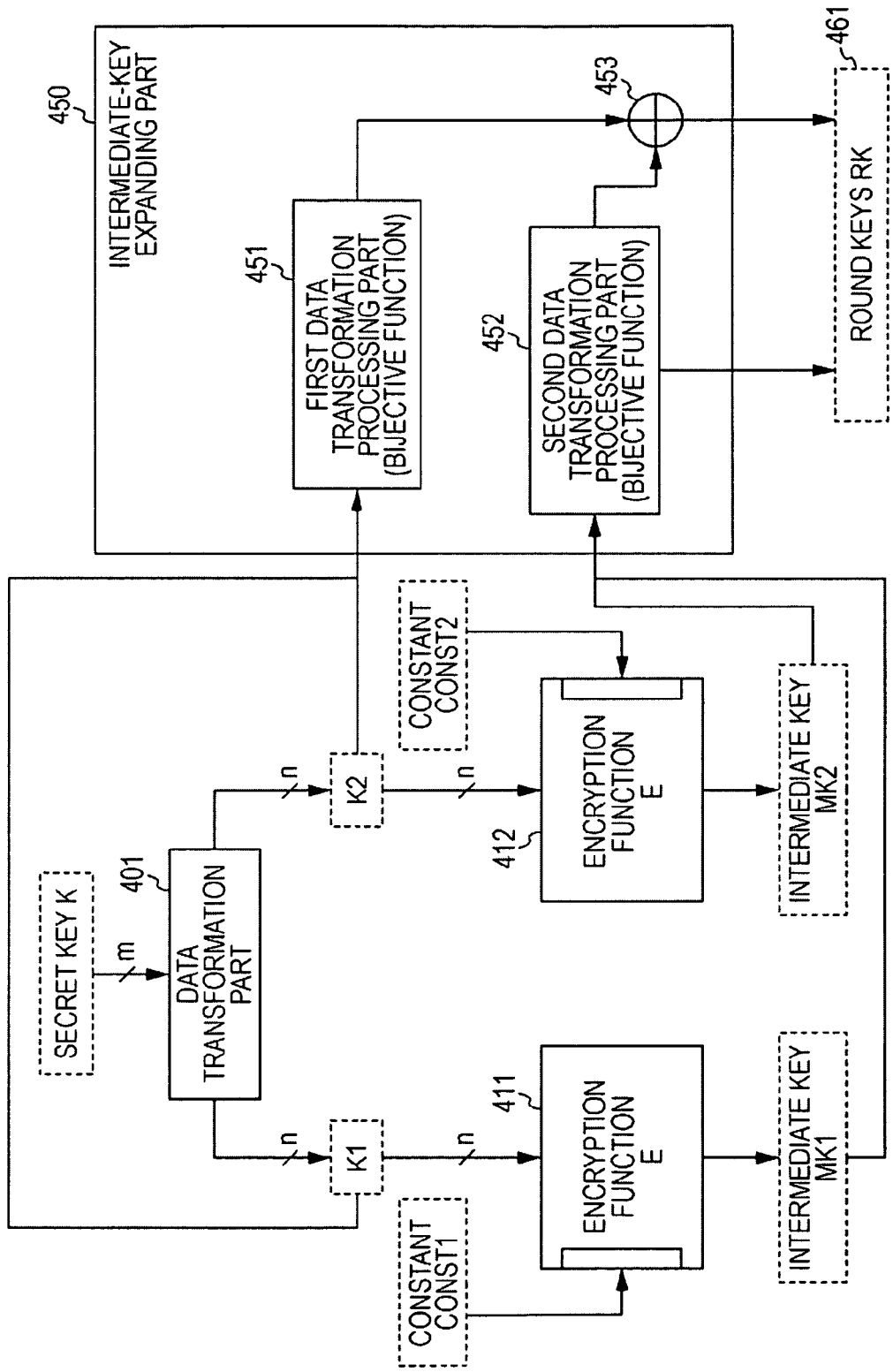
FIG. 25 is a diagram describing the structure of a key scheduling part that generates round keys by applying an intermediate key MK generated by the structure illustrated in FIG. 24 and a secret key K.

Further, with reference to FIG. 25 and FIG. 26, a round-key generation processing structure applying the intermediate-key generating structure illustrated in FIG. 24 will be described. The structure illustrated in FIG. 25 is the structure illustrated in FIG. 24, which additionally includes an intermediate-key expanding part 450 including a first data transformation processing part 451, a second data transformation processing part 452, and an exclusive-OR calculating (EXOR) part 453, and outputs round keys RK461. The round keys are applied to respective round functions of the encryption processing part and are n-bit round keys $\{RK_1, RK_2, \ldots RK_r\}$.

A structure example of round keys $\{RK_1, RK_2, \ldots RK_r\}$ generated by the processing performed by the key scheduling part illustrated in FIG. 25 is illustrated in FIG. 26. In FIG. 26, thirteen round keys $RK_1$ to $RK_{13}$ from the top are given as examples showing some of the generated round keys. $p_a(MK1)$, $P_{a,b}(MK1)$, $p_a(MK2)$, and $P_{a,b}(MK1)$ illustrated in the diagram denote bijective transformation processing performed by the second data transformation processing part 452 illustrated in FIG. 25, each of which is the processing result obtained by applying a bijective function to the intermediate key [MK1] or [MK2] serving as an input. Also, $P_a(k1)$, $P_{a,b}(K1)$, $p_a(k2)$, and $P_{a,b}(K^2)$ illustrated in the diagram denote bijective transformation processing performed by the first data transformation processing part 451 illustrated in FIG. 25, each of which is the processing result obtained by applying a bijective function to the secret-key-transformed data [K1] or [K2] serving as an input. Note that the first data transformation processing part 451 and the second data transformation processing part 452 perform bijection processing in different manners at the time of generating individual round keys.

For example, the first round key $RK_1$ is the result of applying a bijective function $P_1$ to the intermediate key [MK1]; and The second round key $RK_2$ is the result of performing an exclusive-OR operation (EXOR) on the result of applying a bijective function $P_{2,1}$ to the intermediate key [MK1] and the result of applying a bijective function $P_{2,21}$ to the second secret-key-transformed data [K2].

The third round key $RK_3$ is the result of applying a bijective function $P_3$ to the intermediate key [MK2]; and The fourth round key $RK_4$ is the result of performing an exclusive-OR operation (EXOR) on the result of applying a bijective function $P_{4,1}$ to the intermediate key [MK2] and the result of applying a bijective function $P_{2,21}$ to the first secret-key-transformed data [K1].

In this manner, n-bit round keys $\{RK_1, RK_2, \ldots, RK_r\}$ are generated.

The generation processing of round keys $\{RK_1, RK_2, \ldots, RK_r\}$ described with reference to FIG. 25 and FIG. 26 is performed in the following sequence:
(1) The result of applying a predetermined bijective function to MK1 is stored as $RK_1$;
(2) The result of performing an exclusive-OR operation on the result of applying a predetermined bijective function to MK1 and the result of applying a predetermined bijective function to K2 is stored as $RK_2$;
(3) The result of applying a predetermined bijective function to MK2 is stored as $RK_3$;
(4) The result of performing an exclusive-OR operation on the result of applying a predetermined bijective function to MK2 and the result of applying a predetermined bijective function to K1 is stored as $RK_4$;
(5) The result of applying a predetermined bijective function to MK1 is stored as $RK_5$;
(6) The result of performing an exclusive-OR operation on the result of applying a predetermined bijective function to MK1 and the result of applying a predetermined bijective function to K2 is stored as $RK_6$;
(7) The result of applying a predetermined bijective function to MK2 is stored as $RK_7$;
(8) The result of performing an exclusive-OR operation on the result of applying a predetermined bijective function to MK2 and the result of applying a predetermined bijective function to K1 is stored as $RK_8$; . . .
(repeated as above)

Note that, in the above sequence, the structure may exchange the intermediate keys [MK1] and [MK2] for each other. In that case, at the same time, the structure must always exchange the secret-key-transformed data [K1] and [K2] for each other.

By generating a plurality of round keys $\{RK_1, RK_2, \ldots, RK_r\}$ by performing such processing, keys to be output are ensured to have the following characteristics, which contributes to enhancement of encryption strength, that is, enhancement of security by making analysis of the keys more difficult.
(1) The combining of an odd-numbered $RK_i$ (i is an odd number) and $RK_{i+2}$ gives MK1 and MK2, which is the result of bisection of K1|K2. It is thus ensured that, when K changes to a different value, so does $RK_i|RK_{i+2}$ at all times. Therefore, it is ensured that no equivalent keys defined in the foregoing description exist.
(2) The combining of an even-numbered $RK_i$ (i is an even number) and $RK_{i+2}$ gives the result of performing an exclusive-OR operation on values obtained by bisection of 2n-bit data generated from MK1 and MK2 and of 2n-bit data generated from K1 and K2, respectively, and it is thus difficult to reconstruct the values of MK1, MK2, K1, and K2 from the result thereof. Therefore, even if only an even-numbered even-numbered $RK_i$ (i is an even number) and $RK_{i+2}$ are disclosed first by an attack, the value of the original secret key K will not be disclosed.
(3) Since it is ensured that four consecutive $RK_i$, $RK_{i+1}$, $RK_{i+2}$, and $RK_{i+3}$ always store components corresponding to four patterns:
MK1;
MK2;
a combination of MK1 and k2; and
a combination of MK2 and K1,
$2^m$ brute force attacks must always be performed in order to estimate an m-bit value less than or equal to arbitrary 2n bits from 4n bits combining $RK_i$, $RK_{i+1}$, $RK_{i+2}$, and $RK_{i+3}$, resulting in an increase in the analysis cost. Therefore, it becomes more difficult for attackers to analyze the keys. This can be ensured even when bijective functions are cryptographically weak.

Note that, in the present embodiment, as in the above-described embodiment, instead of having all different bijective functions to be used, when at least some of the bijective functions are common bijective functions, the implementation efficiency can be increased.

Figure 27:
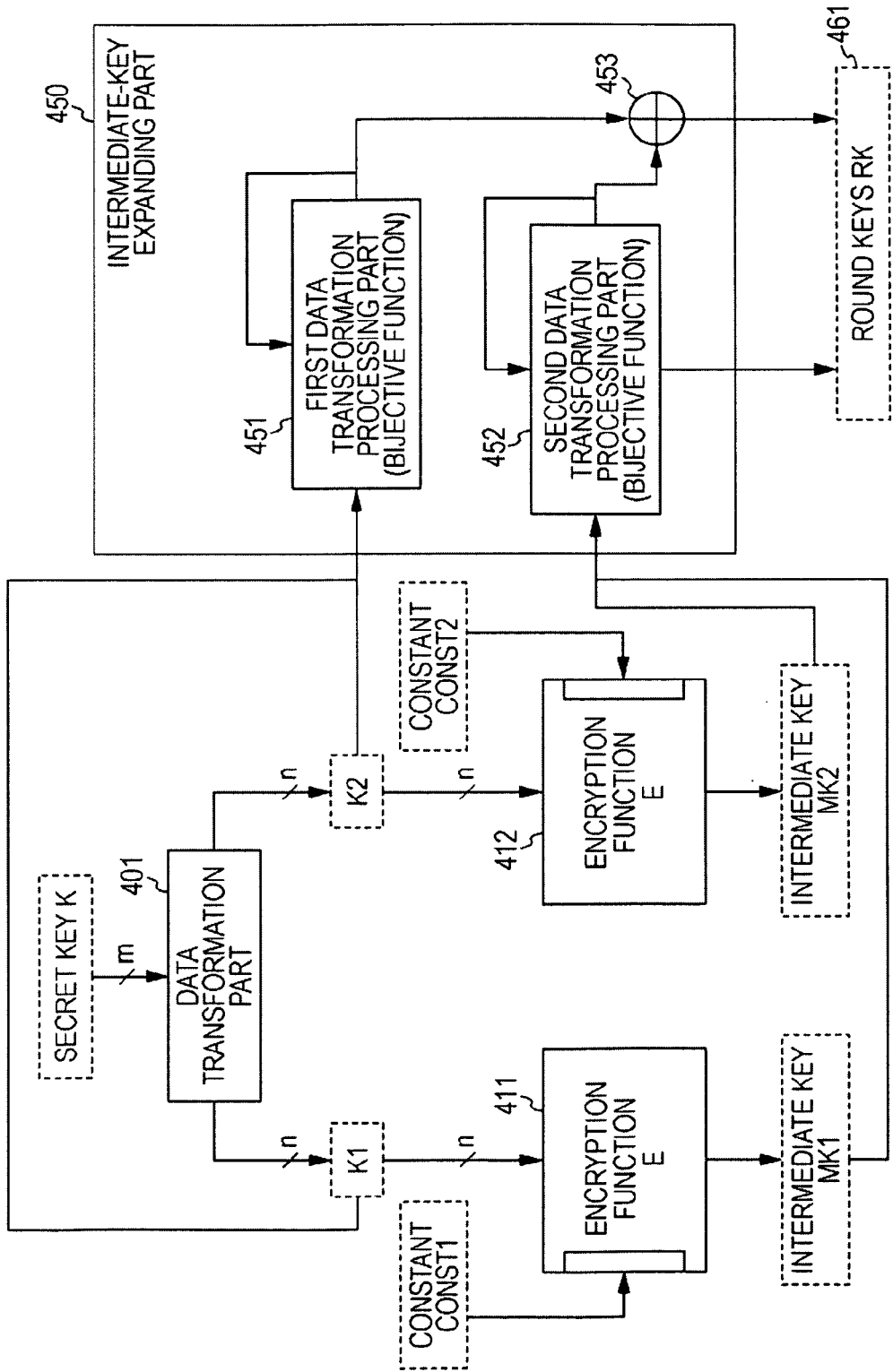
FIG. 27 is a diagram describing a structure example of the key scheduling part illustrated in FIG. 25 in which a common bijective function is used.

For example, in a setting example in which the bijective functions applied to the intermediate key [MK1] are made common, the following processing is performed. The bijective function $P_1$ applied to the intermediate key [MK1] in generation processing of the first generated key $[RK_1]$ and the bijective function $P_{2,1}$ applied to the intermediate key [MK1] in generation processing of the second generated key $[RK_2]$ are made equal. As illustrated in FIG. 27, the second data transformation processing part 452 generates a plurality of pieces of data for round-key generation by performing the following processing:
(1) Let MK1' be the result of applying a bijective function, for the first time, to MK1, which serves as $RK_1$; and
(2) Let MK1" be the result of applying the same bijective function, for the second time, to MK1', which serves as data for generating $RK_2$.

Hereinafter, a similar procedure is repeated to generate data for generating $RK_3$, $RK_4$, . . .

In the above-described processing, the structure example employs common bijective transformation to be applied to the intermediate key [MK1]. Similarly, a structure that employs common bijective transformation to be applied to the intermediate key [MK2] is also feasible. Further, a structure may employ common bijective transformation to be applied to the two intermediate keys [MK1] and [MK2].

Similarly, a structure that employs a common bijective function to be applied to the first secret-key-transformed data [K1], a structure that employs a common bijective function to be applied to the second secret-key-transformed data [K2], and further, a structure that employs a common bijective function to be applied to the first secret-key-transformed data [K1] and the second secret-key-transformed data [K2] are feasible. In these cases, as illustrated in FIG. 27, the first data transformation processing part 451 performs data transformation processing in which a common bijective function is applied to at least some of the transformation processes.

Hardware implementation with this structure can reduce a register area for storing the values of the intermediate keys [MK1] and [MK2] and the secret-key-transformed data [K1] and [K2] and their updated values and the number of bijective functions to be implemented, resulting in a reduction in the implementation cost.

[4. Exemplary Structure of Encryption Processing Apparatus]

Figure 28:
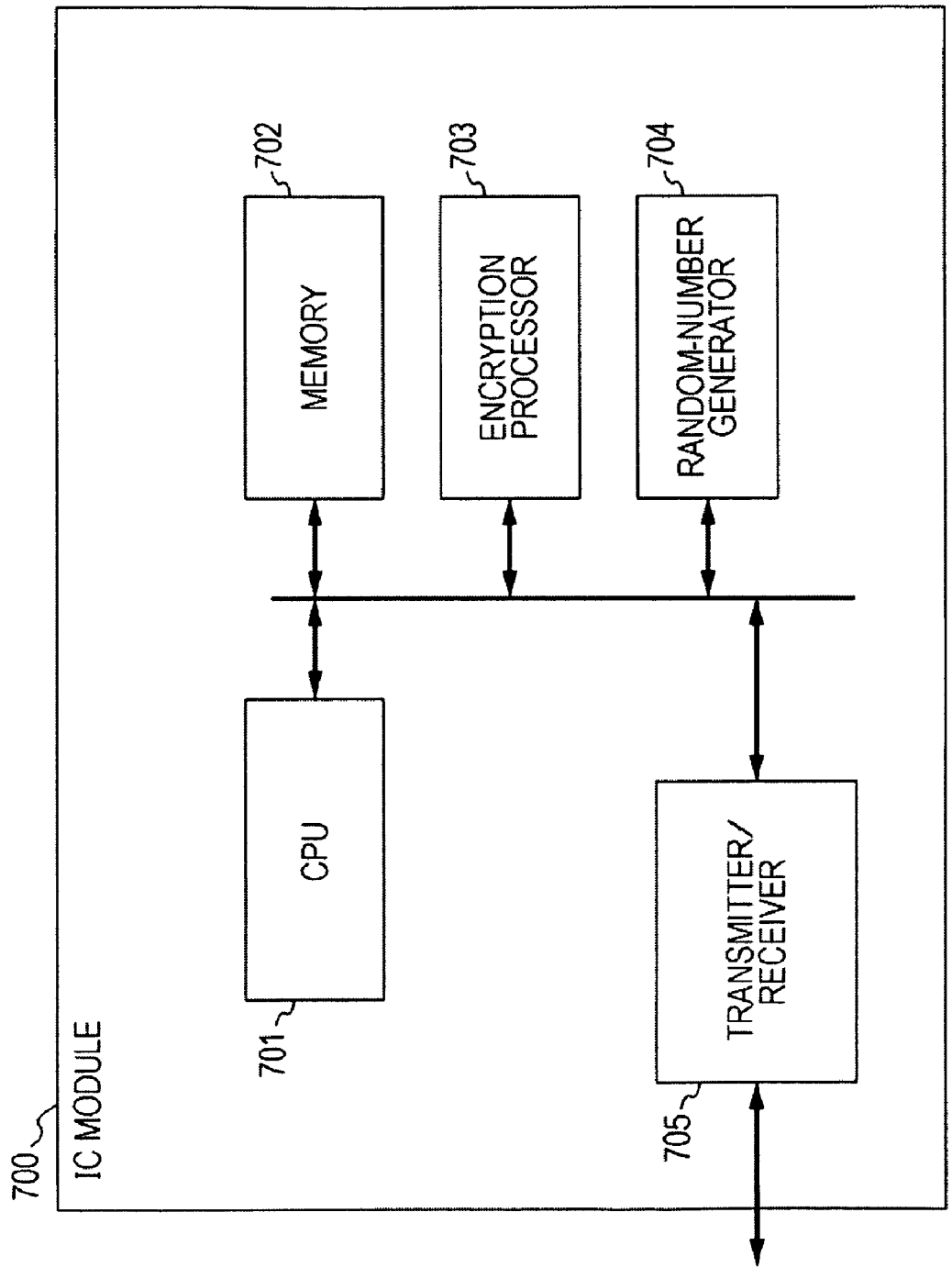
FIG. 28 is a diagram describing a structure example of an IC module serving as an encryption processing apparatus that performs encryption processing according to the present invention.

Finally, a structure example of an IC module 700 serving as an encryption processing apparatus that performs encryption processing in accordance with the above-described embodiments is illustrated in FIG. 28. The above-described processing can be performed by various information processing apparatuses, such as a PC, an IC card, a reader-writer, and the like. The IC module 700 illustrated in FIG. 28 can be configured in any one of these devices.

A CPU (Central Processing Unit) 701 illustrated in FIG. 28 is a processor that controls start and stop of encryption processing, transmission/reception of data, and transfer of data among elements, and executes various other programs. A memory 702 includes, for example, a ROM (Read-Only-Memory) storing a program executed by the CPU 701 or fixed data such as operation parameters, and a RAM (Random Access Memory) used as a storage area or a work area for a program executed in the processing performed by the CPU 701 and parameters changing as needed in the program processing. In addition, the memory 702 can be used as a storage area for, for example, key data necessary for encryption processing, a transformation table (permutation table) applied to encryption processing, and data applied to a transformation matrix. Note that the data storage area is preferably configured as a memory with a tamper-resistant structure.

An encryption processor 703 performs encryption processing and decryption processing in accordance with a common-key blockcipher processing algorithm based on one of the following structures, i.e., for example, the above-described various encryption processing structures:
(a) SPN (Substitution Permutation Network) structure;
(b) Feistel structure; and
(c) Generalized Feistel structure.

In addition, the encryption processor 703 includes a key scheduling part with a structure corresponding to one of the following processing structures, i.e., the structures corresponding to the above-described embodiments:
(3-1: First Category)
Structure of key scheduling part that generates intermediate key based on input of secret key whose bit length is same as block length and generates round keys from generated intermediate key
(3-1A) Structure of intermediate-key generating part that achieves enhancement of security against related-key attack by using encryption function E' ensuring immunity against differential attacks in intermediate-key generating part
(3-1B) Structure of intermediate-key expanding part (round-key generating part) that generates round keys based on intermediate key generated by intermediate-key generating part described in above (3-1A), which achieves enhancement of immunity against attacks on encryption
(3-1C) Structure of intermediate-key expanding part (round-key generating part) that generates round keys based on intermediate key generated by intermediate-key generating part described in above (3-1A), which enhances implementation efficiency without sacrificing security (3-2: Second Category)
Structure of key scheduling part that generates intermediate key based on input of secret key whose bit length can be up to twice block length and generates round keys from generated intermediate key
(3-2A) Structure of key scheduling part having advantages of above (3-1A to C)
(3-2B) Structure of key scheduling part having advantages of above (3-1A to C) and capable of performing processing faster than above (3-2A)

For example, the encryption processor 703 performs the following encryption processing.

First, the key scheduling part in the encryption processor 703 generates round keys to be applied to the execution of round functions in an encryption processing performing part in the encryption processor 703. Generation of the round keys is performed as processing in which an intermediate-key generating part inputs a secret key to an encryption function including round functions employed in the encryption processing performing part and generates an intermediate key, and thereafter an intermediate-key expanding part takes the intermediate key generated by the intermediate-key generating part as an input and generates round keys. Specifically, generation of round keys is performed by using one of the structures described with reference to FIG. 15 through FIG. 27, that is, one of the structures described in above (3-1A to C) and (3-2A, B). Next, the encryption processing performing part takes the round keys as inputs and performs data transformation processing in which the round function is repeated for multiple rounds.

Note that, although the example in which the encryption processing means is a separate module has been described above, instead of providing such an independent encryption processing module, for example, an encryption processing program may be stored in a ROM, and the CPU 701 may be configured to read and execute the program stored on the ROM.

A random-number generator 704 performs generation processing of random numbers which are necessary for generating keys necessary for encryption processing.

A transmitter/receiver 705 is a data communication processor that performs data communication with the outside. For example, the transmitter/receiver 705 performs data communication with an IC module, such as a reader/writer, and performs outputting of ciphertext generated in the IC module or taking data from a device such as an external reader/writer as an input.

The present invention has been described in detail hereinabove with reference to the specific embodiments. It is to be understood, however, that modifications of or alternatives to the embodiments can be made by those skilled in the art without departing from the scope of the present invention. That is, the present invention has been disclosed by way of examples, and the disclosure should not be construed as restrictive. Reference shall be made to the appended claims for determining the scope of the present invention.

Note that the series of processes described in the specification can be executed by hardware, software, or a combination of both. In the case where the series of processes is performed by software, a program recording the processing sequence may be installed in a memory in a computer embedded in dedicated hardware and executed. Alternatively, the program may be installed on a general-purpose computer capable of performing various processes and executed.

For example, the program may be recorded in advance in a hard disk or a ROM (Read Only Memory) serving as a recording medium. Alternatively, the program may be stored (recorded) temporarily or permanently on a removable recording medium such as a flexible disc, a CD-ROM (Compact Disc Read Only Memory), an MO (Magneto optical) disc, a DVD (Digital Versatile Disc), a magnetic disc, or a semiconductor memory. Such removable recording media can be provided as so-called package software.

Note that, besides installing the program from the above-described removable recording medium to a computer, the program may be transferred wirelessly from a download site to a computer, or transferred by wire to a computer via a network such as a LAN (Local Area Network) or the Internet, allowing the computer to receive the program transferred in the foregoing manner and install the program on an internal recording medium such as a hard disk.

Note that the various processes described in the specification are not necessarily performed sequentially in the orders described, and may be performed in parallel or individually in accordance with the processing performance or need of an apparatus that performs the processes. In addition, a system in the present specification refers to a logical assembly of a plurality of apparatuses and is not limited to an assembly in which apparatuses having individual structures are contained in a single housing.

Industrial Applicability

As has been described above, according to a structure of an embodiment of the present invention, a key scheduling part in an encryption processing apparatus that performs common-key blockcipher processing is configured to perform round-key generation processing using an encryption function applied to an encryption processing part. Specifically, a secret key is input to the encryption function including a round function employed in the encryption processing part to generate an intermediate key, and the result of performing bijective transformation based on the intermediate key, the secret key, and the like and the result of performing an exclusive-OR operation on the bijective-transformed data are applied to round keys. With this structure, generation of round keys based on the intermediate key generated using the encryption function whose security has been ensured is performed, thereby making it possible to enhance security, that is, to make analysis of the keys more difficult. At the same time, the structure of the key scheduling part can be simplified by generating keys using the structure of the encryption processing part, thereby making it possible to improve the implementation efficiency.

The invention claimed is:

1. An encryption processing apparatus that performs common-key blockcipher processing, the apparatus comprising:
   an encryption processing part that performs data transformation processing in which a round function is repeated for a plurality of rounds; and
   a key scheduling part that generates round keys to be applied to executing the round function,
   wherein the key scheduling part includes
   an intermediate-key generating part that inputs a secret key to an encryption function including the round function employed by the encryption processing part and generates an intermediate key, and
   an intermediate-key expanding part that takes the intermediate key generated by the intermediate-key generating part as an input and generates round keys, the intermediate-key expanding part comprising:
      a data transformation processing part that takes the intermediate key generated by the intermediate-key generating part as an input and generates intermediate-key bijective-transformed data by performing bijective transformation, and
      an exclusive-OR calculating part that performs an exclusive-OR operation on one of the secret key and secret-key-transformed data generated on the basis of the secret key and on the intermediate-key bijective-transformed data generated by the data transformation processing part, wherein
   the intermediate-key expanding part is configured to output, as round keys, the intermediate-key bijective-transformed data, which is a result of processing performed by the data transformation processing part, and processing result data obtained by the exclusive-OR calculating part.

2. The encryption processing apparatus according to claim 1, wherein the intermediate-key generating part is configured to input the secret key and a preset constant to the encryption function, perform encryption processing, and generate an intermediate key.

3. The encryption processing apparatus according to claim 1, wherein the encryption function applied in the intermediate-key generating part is configured to include at least one stage of the round function.

4. The encryption processing apparatus according to claim 1, wherein the encryption function applied in the intermediate-key generating part is configured to include a plurality of stages of the round function with a Feistel structure employed in the encryption processing part.

5. The encryption processing apparatus according to claim 1, wherein the intermediate-key generating part is configured to use encryption functions employed in the encryption processing part in parallel to one another to generate a plurality of intermediate keys.

6. The encryption processing apparatus according to claim 1, wherein the intermediate-key generating part is configured to take as an input a secret key having the same number of bits as a block length which is a unit for processing in the encryption function employed in the encryption processing part and generate an intermediate key having the same number of bits.

7. The encryption processing apparatus according to claim 1, wherein the intermediate-key generating part is configured to take as an input a secret key having a number of bits greater than or equal to a block length which is a unit for processing in the encryption function employed in the encryption processing part, perform data transformation of the input secret key, generate a plurality of pieces of secret-key-transformed data having the same number of bits as the block length, input the secret-key-transformed data to the encryption function, and generate intermediate keys.

8. The encryption processing apparatus according to claim 1, wherein the intermediate-key expanding part is configured to include
   a first data transformation processing part that takes as an input at least one of the secret key and secret-key-transformed data generated on the basis of the secret key and generates secret-key bijective-transformed data by performing bijective transformation, and
   a second data transformation processing part that takes the intermediate key generated by the intermediate-key generating part as an input and generates intermediate-key bijective-transformed data by performing bijective transformation, and
   an exclusive-OR calculating part that performs an exclusive-OR operation on the secret-key bijective-transformed data generated by the first data transformation processing part and the intermediate-key bijective-transformed data generated by the second data transformation processing part, and the intermediate-key expanding part is configured to output, as round keys, the intermediate-key bijective-transformed data, which is a result of processing performed by the second data transformation processing part, and processing result data obtained by the exclusive-OR calculating part.

9. The encryption processing apparatus according to claim 1, wherein at least some of bijective functions applied to bijective transformation performed by the first data transformation processing part to generate respective round keys are common bijective functions.

10. The encryption processing apparatus according to claim 1, wherein at least some of bijective functions applied to bijective transformation performed by the second data transformation processing part to generate respective round keys are common bijective functions.

11. An encryption processing method for an encryption processing apparatus that performs common-key blockcipher processing, the method comprising:
a key scheduling step of generating, with a key scheduling part, round keys applied to executing a round function executed by an encryption processing part; and
an encryption processing step of taking, with the encryption processing part, the round keys as inputs and performing data transformation processing in which the round function is repeated for a plurality of rounds,
wherein the key generating step includes
an intermediate-key generating step of inputting, with an intermediate-key generating part, a secret key to an encryption function including the round function employed by the encryption processing part and generating an intermediate key, and
an intermediate-key expanding step of taking, with an intermediate-key expanding part, the intermediate key generated by the intermediate-key generating part as an input and generating round keys, the intermediate-key expanding step further comprising:
a data transformation processing step for taking, with a data transformation processing part, the intermediate key generated by the intermediate-key generating part as an input and generates intermediate-key bijective-transformed data by performing bijective transformation, and
an exclusive-OR calculating step for performing, with an exclusive-OR calculation part, an exclusive-OR operation on one of the secret key and secret-key-transformed data generated on the basis of the secret key and on the intermediate-key bijective-transformed data generated by the data transformation processing part, wherein the intermediate-key expanding step further comprises outputting, as round keys, the intermediate-key bijective-transformed data, which is a result of processing performed by the data transformation processing part, and processing result data obtained by the exclusive-OR calculating part.

12. A non-transitory computer-readable medium encoded with a computer program for allowing an encryption processing apparatus that performs common-key blockcipher processing to perform encryption processing, the encryption processing comprising:
a key scheduling step of generating, with a key scheduling part, round keys applied to executing a round function executed by an encryption processing part; and
an encryption processing step of taking, with the encryption processing part, the round keys as inputs and performing data transformation processing in which the round function is repeated for a plurality of rounds,
wherein the key generating step includes
an intermediate-key generating step of inputting, with an intermediate-key generating part, a secret key to an encryption function including the round function employed by the encryption processing part and generating an intermediate key, and
an intermediate-key expanding step of taking, with an intermediate-key expanding part, the intermediate key generated by the intermediate-key generating part as an input and generating round keys, the intermediate-key expanding step further comprising:
a data transformation processing step for taking, with a data transformation processing part, the intermediate key generated by the intermediate-key generating part as an input and generates intermediate-key bijective-transformed data by performing bijective transformation, and
an exclusive-OR calculating step for performing, with an exclusive-OR calculation part, an exclusive-OR operation on one of the secret key and secret-key-transformed data generated on the basis of the secret key and on the intermediate-key bijective-transformed data generated by the data transformation processing part, wherein the intermediate-key expanding step further comprises outputting, as round keys, the intermediate-key bijective-transformed data, which is a result of processing performed by the data transformation processing part, and processing result data obtained by the exclusive-OR calculating part.

13. A decryption processing apparatus that performs common-key blockcipher processing, the apparatus comprising:
a decryption processing part that performs data transportation processing in which a round function is repeated for a plurality of rounds; and
a key scheduling part that generates round keys to be applied to executing the round function,
wherein the key scheduling part includes
an intermediate-key generating part that inputs a secret key to a decryption function including the round function employed by the decryption processing part and generates an intermediate key, and
an intermediate-key expanding part that takes the intermediate key generated by the intermediate-key generating part as an input and generates round keys, the intermediate-key expanding part comprising:
a data transformation processing part that takes the intermediate key generated by the intermediate-key generating part as an input and generates intermediate-key bijective-transformed data by performing bijective transformation, and
an exclusive-OR calculating part that performs an exclusive-OR operation on one of the secret key and secret-key-transformed data generated on the basis of the secret key and on the intermediate-key bijective-transformed data generated by the data transformation processing part, wherein
the intermediate-key expanding part is configured to output, as round keys, the intermediate-key bijective-transformed data, which is a result of processing performed by the data transformation processing part, and processing result data obtained by the exclusive-OR calculating part.

14. The decryption processing apparatus according to claim 13, wherein the intermediate-key generating part is configured to input the secret key and a preset constant to the decryption function, perform decryption processing, and generate an intermediate key.

15. The decryption processing apparatus according to claim 13, wherein the decryption function applied in the intermediate-key generating part is configured to include at least one stage of the round function.

16. The decryption processing apparatus according to claim 13, wherein the decryption function applied in the intermediate-key generating part is configured to include a plurality of stages of the round function with a Feistel structure employed in the decryption processing part.

17. The decryption processing apparatus according to claim 13, wherein the intermediate-key generating part is configured to use decryption functions employed in the decryption processing part in a parallel to one another to generate a plurality of intermediate keys.

18. The decryption processing apparatus according to claim 13, wherein the intermediate-key generating part is configured to take as an input a secret key having the same number of bits as a block length which is a unit for processing in the decryption function employed in the decryption processing part and generate an intermediate key having the same number of bits.

19. The decryption processing apparatus according to claim 13, wherein the intermediate-key generating part is configured to take as an input a secret key having a number of bits greater than or equal to a block length which is a unit for processing in the decryption function employed in the decryption processing part, perform data transformed data having the same number of bits as the block length, input the secret-key-transformed data to the decryption function, and generate intermediate keys.

20. The decryption processing apparatus according to claim 13, wherein the intermediate-key expanding part is configured to include
    a first data transformation processing part that takes as an input at least one of the secret key and secret-key-transformed data generated on the basis of the secret key and generates secret-key bijective-transformed data by performing bijective transformation, and
    a second data transformation processing part that takes the intermediate key generated by the intermediate-key generating part as an input and generates intermediate-key bijective-transformed data by performing bijective transformation, and
    an exclusive-OR calculating part that performs an exclusive-OR operation on the secret-key bijective-transformed data generated by the first data transformation processing part and the intermediate-key bijective-transformed data generated by the second data transformation processing part, and
    the intermediate-key expanding part is configured to output, as round keys, the intermediate-key bijective-transformed data, which is a result of processing performed by the second data transformation processing part, and processing result data obtained by the exclusive-OR calculating part.

21. The encryption processing apparatus according to claim 13, wherein at least some of bijective functions applied to bijective transformation performed by the first data transformation processing part to generate respective round keys are common bijective functions.

22. The encryption processing apparatus according to claim 13, wherein at least some of bijective functions applied to bijective transformation performed by the second data transformation processing part to generate respective round keys are common bijective functions.

23. A decryption processing method for an decryption processing apparatus that performs common-key blockcipher processing, the method comprising:
    a key scheduling step of generating, with a key scheduling part, round keys applied to executing a round function executed by an decryption processing part; and
    an decryption processing step of taking, with the decryption processing part, the round keys as inputs and performing data transformation processing in which the round function is repeated for a plurality of rounds,
    wherein the key generating step includes
    an intermediate-key generating step of inputting, with an intermediate-key generating part, a secret key to an decryption function including the round function employed by the decryption processing part and generating an intermediate key, and
    an intermediate-key expanding step of taking, with an intermediate-key expanding part, the intermediate key generated by the intermediate-key generating part as an input and generating round keys, the intermediate-key expanding step further comprising:
        a data transformation processing step for taking, with a data transformation processing part, the intermediate key generated by the intermediate-key generating part as an input and generates intermediate-key bijective-transformed data by performing bijective transformation, and
        an exclusive-OR calculating step for performing, with an exclusive-OR calculation part, an exclusive-OR operation on one of the secret key and secret-key-transformed data generated on the basis of the secret key and on the intermediate-key bijective-transformed data generated by the data transformation processing part, wherein the intermediate-key expanding step further comprises outputting, as round keys, the intermediate-key bijective-transformed data, which is a result of processing performed by the data transformation processing part, and processing result data obtained by the exclusive-OR calculating part.

24. A non-transitory computer-readable medium encoded with a computer program for allowing an encryption processing apparatus that performs common-key blockcipher processing to perform encryption processing, the encryption processing comprising:
    a key scheduling step of generating, with a key scheduling part, round keys applied to executing a round function executed by an encryption processing part; and
    an decryption processing step of taking, with the decryption processing part, the round keys as inputs and performing data transformation processing in which the round function is repeated for a plurality of rounds,
    wherein the key generating step includes
    an intermediate-key generating step of inputting, with an intermediate-key generating part, a secret key to an encryption function including the round function employed by the encryption processing part and generating an intermediate key, and
    an intermediate-key expanding step of taking, with an intermediate-key expanding part, the intermediate key generated by the intermediate-key generating part as an input and generating round keys, the intermediate-key expanding step further comprising:
        a data transformation processing step for taking, with a data transformation processing part, the intermediate key generated by the intermediate-key generating part as an input and generates intermediate-key bijective-transformed data by performing bijective transformation, and an exclusive-OR calculating step for performing, with an exclusive-OR calculation part, an exclusive-OR operation on one of the secret key and secret-key-transformed data generated on the basis of the secret key and on the intermediate-key bijective-transformed data generated by the data transformation processing part, wherein the intermediate-key expanding step further comprises outputting, as round keys, the intermediate-key bijective-transformed data, which is a result of processing performed by the data transformation processing part, and processing result data obtained by the exclusive-OR calculating part.

25. An information processing apparatus that performs common-key blockcipher processing, the apparatus comprising:

at least one processor, at least one memory part, a encryption processing part that performs data transportation processing in which a round function is repeated for a plurality of rounds; and a key scheduling part that generates round keys to be applied to executing the round function, wherein the key scheduling part includes an intermediate-key generating part that inputs a secret key to a encryption function including the round function employed by the encryption processing part and generates an intermediate key, and an intermediate-key expanding part that takes the intermediate key generated by the intermediate-key generating part as an input and generates round keys, the intermediate-key expanding part comprising:

a data transformation processing part that takes the intermediate key generated by the intermediate-key generating part as an input and generates intermediate-key bijective-transformed data by performing bijective transformation, and an exclusive-OR calculating part that performs an exclusive-OR operation on one of the secret key and secret-key-transformed data generated on the basis of the secret key and on the intermediate-key bijective-transformed data generated by the data transformation processing part, wherein the intermediate-key expanding part is configured to output, as round keys, the intermediate-key bijective-transformed data, which is a result of processing performed by the data transformation processing part, and processing result data obtained by the exclusive-OR calculating part.

26. A decryption processing apparatus that performs common-key blockcipher processing, the apparatus comprising:

at least one processor, at least one memory part, a decryption processing part that performs data transportation processing in which a round function is repeated for a plurality of rounds; and a key scheduling part that generates round keys to be applied to executing the round function, wherein the key scheduling part includes an intermediate-key generating part that inputs a secret key to a decryption function including the round function employed by the encryption processing part and generates an intermediate key, and an intermediate-key expanding part that takes the intermediate key generated by the intermediate-key generating part as an input and generates round keys, the intermediate-key expanding part comprising:

a data transformation processing part that takes the intermediate key generated by the intermediate-key generating part as an input and generates intermediate-key bijective-transformed data by performing bijective transformation, and an exclusive-OR calculating part that performs an exclusive-OR operation on one of the secret key and secret-key-transformed data generated on the basis of the secret key and on the intermediate-key bijective-transformed data generated by the data transformation processing part, wherein the intermediate-key expanding part is configured to output, as round keys, the intimidate-key bijective-transformed data, which is a result of processing performed by the data transformation processing part, and processing result data obtained by the exclusive-OR calculating part.

* * * * *